United States Patent
Sasaki et al.

(10) Patent No.: US 6,586,061 B1
(45) Date of Patent: Jul. 1, 2003

(54) MULTI-LAYER FILM AND MEDICAL BAG USING THE SAME

(75) Inventors: Yoshihiko Sasaki, Mie (JP); Kazutoshi Takenaka, Mie (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/539,878

(22) Filed: Mar. 31, 2000

(30) Foreign Application Priority Data

| Apr. 1, 1999 | (JP) | 11-095582 |
| Nov. 10, 1999 | (JP) | 11-320384 |
| Dec. 7, 1999 | (JP) | 11-347040 |

(51) Int. Cl.$^7$ .................. B29D 22/00; B29D 23/00; B32B 1/08; B32B 27/00; B32B 27/08

(52) U.S. Cl. ................. 428/35.2; 428/35.7; 428/500; 428/515; 428/516; 428/517; 428/519

(58) Field of Search ............. 428/35.2, 35.7, 428/500, 515, 516, 517, 519

(56) References Cited

U.S. PATENT DOCUMENTS

| 5,128,212 A | 7/1992 | Kneale et al. ........... 428/516 |
| 5,783,269 A | * 7/1998 | Heilmann et al. ........ 428/35.2 |
| 5,874,139 A | * 2/1999 | Bosiers et al. ........... 428/35.2 |

FOREIGN PATENT DOCUMENTS

| EP | 0 327 368 | 8/1989 |
| EP | 0567210 | 10/1993 |
| WO | WO 93/03093 | 2/1983 |

* cited by examiner

*Primary Examiner*—Harold Pyon
*Assistant Examiner*—Michael C. Miggins
(74) *Attorney, Agent, or Firm*—Oblon, Spivak, McClelland, Maier & Neustadt, P.C.

(57) ABSTRACT

A multi-layer film contains at least a first layer, a second layer inside thereof, and a third layer inside the second layer. The first layer contains a polypropylene resin (PP). The second layer contains a polyethylene resin (PE) having 70 to 90 wt% of a lower crystalline component (LCC) and 10 to 30 wt% of a higher crystalline component (HCC). The PE has a melt flow rate of 0.1 to 20 g/10 min and in a temperature rising elution fraction elution curve, an elution peak temperature of the LCC is from 45 to 85° C; the ratio of (peak height of LCC)/(height of the minimum valley between LCC peak and HCC peak) is 9 or more; an area ratio of the elution peak temperature or less of LCC is 35% or more. The third layer contains a) PP or b) a high-pressure low density PE having an extrapolation melting completion temperature of melting of 110° C or more; or c) a copolymer of ethylene/$C_{3-18}$ α-olefin having a density of 0.920 g/cm$^3$ or more.

8 Claims, 1 Drawing Sheet

MULTI-LAYER FILM AND MEDICAL BAG USING THE SAME

FIELD OF THE INVENTION

This invention relates to a multi-layer film which has excellent properties such as hygienic nature, flexibility, transparency, heat resistance, bag drop strength, heat seal aptitude and pin hole resistance and to a medical bag which comprises the multi-layer film and is used as a container such as of drug solutions and blood samples.

BACKGROUND OF THE INVENTION

Currently, hard containers made, for example, of glass, polyethylene or polypropylene and soft bags made of polyvinyl chloride containing a plasticizer are known as medical containers. However, in the case of the former hard containers, it is necessary to introduce air using an infusion set equipped with an air needle or air vent when the included liquid is dripped. In addition, there is a possibility of causing pollution of the included liquid. Also, hard containers made of polyethylene or polypropylene have a problem in that it is difficult to see amount of the included liquid because of their insufficient transparency.

On the other hand, the latter soft bags have advantages in that they do not require the introduction of air such as the case of the hard containers and they have high safety and carrying convenience due, for example, to deflation of the bag itself by the atmospheric pressure with dripping of the included liquid. However, they have a problem in that the plasticizer and residual monomers contained in the polyvinyl chloride are precipitated as fine particles in the included liquid. Thus, a substitute for such a material is expected.

Contrary to this, a medical bag in which an ethylene-vinyl acetate copolymer, an elastomer or the like polymer is used in the intermediate layer has been proposed from flexibility, transparency, hygienic nature and the like points of view (JP-A-58-165866; the term "JP-A" as used herein means an "unexamined published Japanese patent application") but, being poor in heat resistance, such a polymer to be used in the intermediate layer has a disadvantage in terms of poor appearances such as formation of wrinkles at the time of sterilization or reduction of transparency after sterilization. In addition, it sometimes causes other problems such as generation of pin holes at the time of transportation and breakage of the bags when they are dropped.

On the other hand, JP-A-6-171039 proposes a multi-layer film in which a polypropylene resin is used in the outer layer and a conventional straight chain ethylene-α-olefin copolymer is used in the intermediate layer, and JP-A-9-141793 proposes a multi-layer film in which a polypropylene resin is used in the outer layer and an ethylene-α-olefin copolymer having a single melting point produced using a metallocene catalyst is used in the intermediate layer. However, transparency, strength, flexibility and heat resistance of the medical bags comprising these multi-layer films are not well-balanced at high levels.

In addition, since a material having heat resistance is arranged in the inner layer from the viewpoint of heat resistance, there is almost no difference in melting point between the outer layer and inner layer, thus causing a problem in that the working efficiency is reduced due to taking of the outer layer by a seal bar at the time of bag making (adsorption of the outer layer to the upper side seal bar).

Thus, medical bags free from the problems, namely those which have good hygienic nature, excellent flexibility and transparency, high heat resistance, good strength against bag breakage when dropped and excellent heat seal aptitude, have not been achieved by the conventional multi-layer medical bags.

SUMMARY OF THE INVENTION

In view of the above, it therefore becomes an object of the invention to provide a multi-layer film which has high hygienic nature and excellent flexibility, transparency and pin hole resistance, and also has excellent heat seal aptitude and good heat resistance and bag drop strength, and a medical bag which comprises the multi-layer film and is used as a container such as of drug solutions and blood samples.

As a result of intensive studies, the present inventors have accomplished this invention by finding that the just described object of the invention can beachieved by a multi-layer film which contains at least a first layer and a second layer inside thereof, in which a polyolefin resin composition is used in the first layer, and an ethylene-α-olefin copolymer which comprises a lower crystalline component and a higher crystalline component and has a specified melt flow rate (to be referred to as "MFR" hereinafter) and specified properties is used in the inside second layer.

That is, the object of the invention is achieved by a multi-layer film which comprises at least a first layer and a second layer inside thereof, wherein the first layer comprises a polyolefin resin composition, and the second layer comprises a polyethylene resin material comprising a copolymer of ethylene with an α-olefin having from 3 to 18 carbon atoms, the copolymer comprising a lower crystalline component and a higher crystalline component and satisfying the following physical properties (B1) to (B4):

(B1) in a temperature rising elution fraction (TREF) elution curve of the copolymer, an elution peak temperature of the lower crystalline component is from 45 to 85° C., (B2) in the temperature rising elution fraction (TREF) elution curve of the copolymer, an H/M value is 9 or more, wherein H is a peak height of the lower crystalline component and M is a height of the minimum valley between the lower crystalline component peak and higher crystalline component peak, (B3) area ratio of the elution peak temperature or less of the lower crystalline component is 35% or more based on the total area of the temperature rising elution fraction (TREF) elution curve of the copolymer, and (B4) a melt flow rate (MFR) of the copolymer is from 0.1 to 20 g/10 minutes.

More preferred are the following first and second embodiments.

That is, a first embodiment of the invention provides a multi-layer film which contains at least an outer layer, an intermediate layer and, more preferably, an inner layer in that order, wherein the outer layer comprises a polyolefin resin composition, and the intermediate layer comprises a polyethylene resin material including a copolymer of ethylene with an α-olefin having from 3 to 18 carbon atoms, the copolymer containing a lower crystalline component and a higher crystalline component and satisfying all of the following physical properties (B1) to (B4)

(B1) in an elution curve obtained by temperature rising elution fraction of the copolymer, an elution peak temperature of the lower crystalline component is from 45 to 85° C., (B2) in the elution curve obtained by temperature rising elution fraction of the copolymer, an H/M value is 9 or more, wherein H is a peak height of the lower crystalline component and M is a height of the minimum valley between the lower crystalline component peak and higher crystalline component peak, (B3) an area ratio of the elution peak temperature or less of the lower crystalline component is 35% or more based on the total area of the elution curve obtained by temperature rising elution fraction of the copolymer, and (B4) a melt flow rate of the copolymer is from 0.1 to 20 g/10 minutes.

The invention also provides the multi-layer film, wherein the inner layer comprises a resin material selected from the group consisting of a polypropylene resin; a high-pressure low density polyethylene having an extrapolation melting completion temperature of melting peak, obtained by a differential scanning calorimetry (DSC), of 110° C. or more; and a copolymer of ethylene with an α-olefin having from 3 to 18 carbon atoms, having a density of 0.920 g/cm or more.

The invention also provides the multi-layer film, wherein the lower crystalline component of the copolymer of ethylene with an α-olefin having from 3 to 18 carbon atoms in the intermediate layer is polymerized using a metallocene compound containing a tetravalent transition metal, as a polymerization catalyst.

The invention also provides a medical bag which comprises any one of the above multi-layer films of the first embodiment.

A second embodiment of the invention is a multi-layer film which comprises at least an outer layer and an inner layer in that order, wherein the outer layer comprises a polyolefin resin material preferably satisfying the following physical property (A1), and the inner layer comprising a polyethylene resin material including a copolymer of ethylene with an α-olefin having from 3 to 18 carbon atoms, the copolymer comprising a lower crystalline component and a higher crystalline component and satisfying all of the following physical properties (B1) to (B4) and, preferably, (B5)

(A1) Vicat softening temperature Ta is Tb<Ta≦140° C., (B1) in a temperature rising elution fraction (TREF) elution curve of the copolymer components, an elution peak temperature of the lower crystalline component is from 45 to 85° C., (B2) in the temperature rising elution fraction (TREF) elution curve of the copolymers, an H/M value is 9 or more, wherein H is a peak height of the lower crystalline component and M is a height of the minimum valley between the lower crystalline component peak and higher crystalline component peak, (B3) an area ratio of the elution peak temperature or less of the lower crystalline component is 35% or more based on the total area of the temperature rising elution fraction (TREF) elution curve of the copolymer component, (B4) MFR of the copolymer component is from 0.1 to 20 g/10 minutes, and (B5) Vicat softening temperature Tb is from 65 to 125° C.

Also, the invention is the multi-layer film, wherein the outer layer comprises a resin material selected from the group consisting of a polypropylene resin which satisfies the above physical property; a high-pressure low density polyethylene having an extrapolation melting completion temperature of melting peak, obtained by a differential scanning calorimetry (DSC), of 110° C. or more; and a copolymer of ethylene with an α-olefin having from 3 to 18 carbon atoms, having a density of 0.910 g/cm$^3$ or more.

Also, the invention also provides a medical bag which comprises any one of the above multi-layer films of the second embodiment.

BRIEF DESCRIPTION OF THE DRAWINGS

FIGS. 2A and 2B are graphs showing TREF elution curves in the case of three peaks, wherein FIG. 2A is a case in which a peak lower than the elution peak of lower crystalline component is present within a temperature range which is lower than the elution temperature of the elution peak of lower crystalline component, and FIG. 2B is a case in which a peak lower than the elution peak of lower crystalline component is present between the elution peak of higher crystalline component and the elution peak of lower crystalline component.

Figure 1:
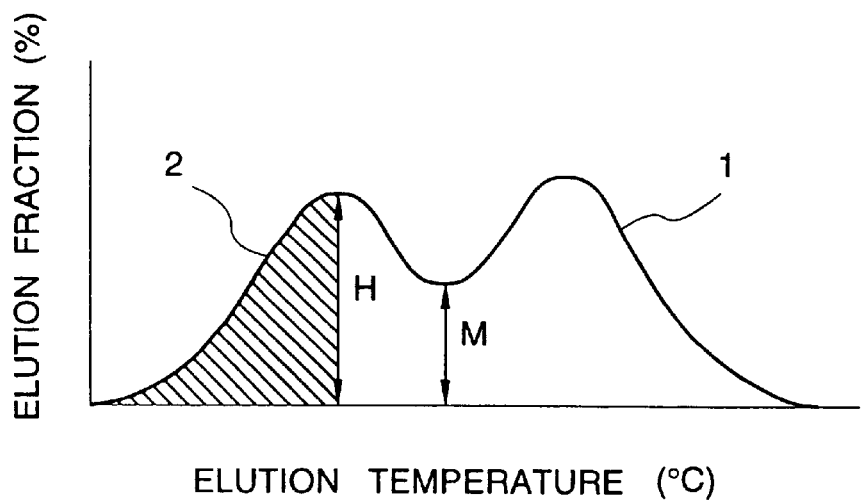
FIG. 1 is a graph showing a TREF elution curve in the case of two peaks.

In these drawings, 1 is the elution peak of higher crystalline component and 2 is the elution peak of lower crystalline component.

DETAILED DESCRIPTION OF THE INVENTION

The first embodiment of the invention is described in the following.

The multi-layer film of the first embodiment of the invention contains at least an outer layer, an intermediate layer and, preferably, an inner layer in that order.

(1) Outer Layer

The outer layer of the first embodiment of the invention comprises a polypropylene resin. Its illustrative examples include a propylene homopolymer and a random copolymer of propylene with ethylene or an α-olefin having 4 or more carbon atoms. Examples of the α-olefin having 4 or more carbon atoms include 1-butene, 1-pentene, 1-hexene, 1-octene, 1-heptene and 4-methyl-pentene-1,4-methyl-hexene-1,4,4-dimethylpentene-1. In the random copolymer, ratio of the constituting unit derived from propylene (propylene unit) is preferably 80% by weight or more, particularly preferably 85% by weight or more.

MFR of the polypropylene resin is not particularly limited, but it is preferably from 0.1 to 100 g/10 minutes, particularly preferably from 0.3 to 80 g/10 minutes. The term MFR as used herein is a value measured in accordance with the procedure of JIS-K6758 (230° C., 2.16 kg loading). The MFR value within the above range exerts an advantage in that the formed membrane is stabilized.

Illustrative examples of such a polypropylene resin include a propylene-ethylene random copolymer, a propylene-1-butene copolymer and a propylene-ethylene-1-butene copolymer.

In addition, in order to provide flexibility or/and improve interlayer adhesive property, a crystalline ethylene-α-olefin copolymer polymerized using a Ziegler type or metallocene catalyst and/or a rubber compound such as EBR, EPR or the like ethylene-α-olefin elastomer or SEBS, HSBC (a hydrogenated styrene block copolymer) or the like styrene elastomer may be formulated in an amount of from 3 to 75% by weight, based on the total weight of the polypropylene resin.

(2) Intermediate Layer

The intermediate layer of the first embodiment of the invention comprises a polyethylene resin material which contains, as the main component, a copolymer of ethylene with an α-olefin having from 3 to 18 carbon atoms, that contains a lower crystalline component and a higher crystalline component and satisfies all of the following physical properties (B1) to (B4) (to be referred to as "ethylene-α-olefin copolymer" or simply as "copolymer" hereinafter).

(B1) Peak Temperature of Elution Curve by Temperature Rising Elution Fraction

Regarding the copolymer of the invention, the elution curve obtained by its temperature rising elution fraction shows specified properties.

In this connection, the temperature rising elution fraction (TREF) is a method in which a polymer is once completely dissolved at a high temperature and then cooled, thereby effecting formation of a thin polymer layer on the surface of an inert carrier, the temperature is increased continuously or stepwise to recover the eluted component (polymer), and its concentration is continuously detected to calculate amount and elution temperature of the eluted component. A graph drawn by the elution fraction and elution temperature is the elution curve by which a compositional distribution (distribution of molecular weight and crystallinity) of the polymer can be measured. Details such as of themeasuring-methodof the temperature risingelutionfraction (TREF) and apparatus are described in *Journal of Applied Polymer Science*, vol. 26, pp. 4217–4231 (1981).

Shape of the elution curve obtained by TREF varies depending on the distribution of molecular weight and crystallinity of the polymer. For example, there are a curve of one peak, a curve of two peaks and a curve of three peaks, and the curve of two peaks is divided into certain cases such as a case in which the peak having high elution temperature has large elution fraction (peak height is high) in comparison with the peak having low elution temperature and a case in which the peak having high elution temperature has small elution fraction (peak height is low) in comparison with the peak having low elution temperature.

Since the copolymer to be used in the invention contains at least a lower crystalline component and a higher crystalline component, it has at least two peaks (elution peaks) in the elution curve. In the case of two peaks, the peak having high elution temperature is the elution peak of higher crystalline component and the peak having low elution temperature is the elution peak of lower crystalline component.

The copolymer is not particularly limited, with the proviso that it has at least two elution peaks, for example, it may have three or more elution peaks. In that case, the peak having the highest elution temperature among the elution peaks is the elution peak of higher crystalline component, and the peak having the highest height among peaks of lower elution temperature than the elution peak of the higher crystalline component is the elution peak of lower crystalline component. In consequence, a peak having lower height than the elution peak of lower crystalline component may be present within a temperature range which is lower than the elution temperature of the elution peak of lower crystalline component, and a peak having lower height than the elution peak of lower crystalline component may be present between the elution peak of higher crystalline component and the elution peak of lower crystalline component. Also, a peak having lower height than the elution peak of lower crystalline component may be present both within the temperature range lower than the elution temperature of the elution peak of lower crystalline component and in a temperature range between the elution peak of higher crystalline component and the elution peak of lower crystalline component.

Figure 2A:
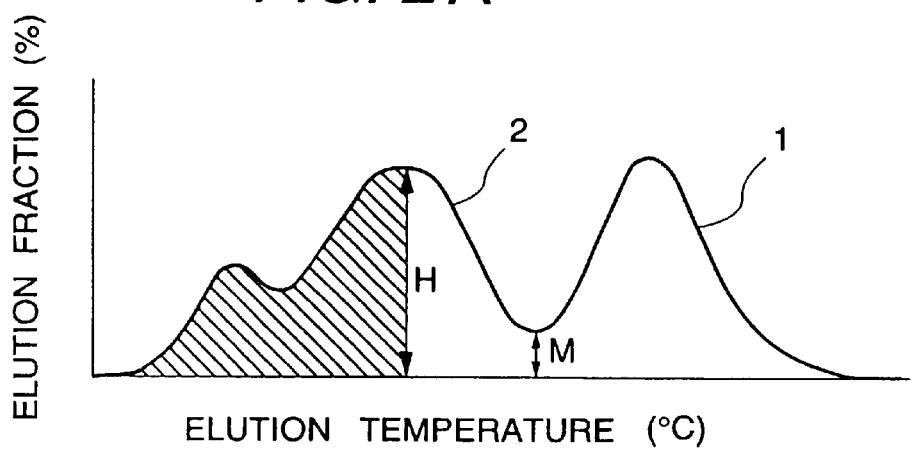
Figure 2B:
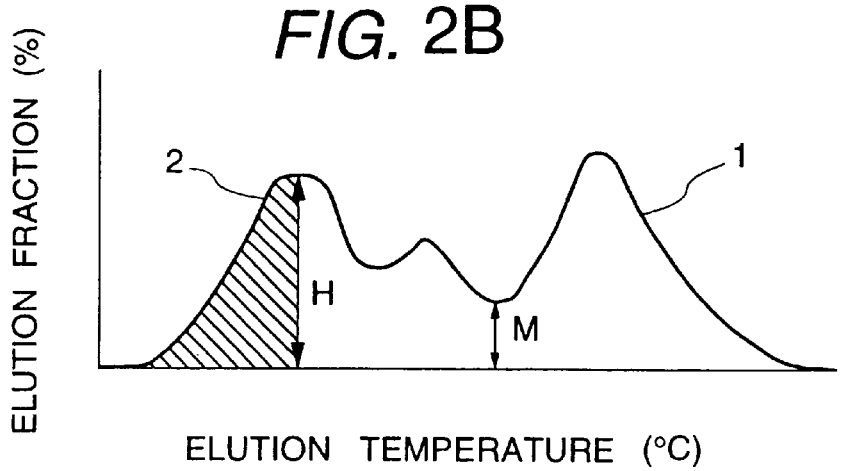

These cases are illustratively described with reference to the drawings. FIG. 1 is an elution curve in the case of two peaks, and FIG. 2A and 2B are elution curves in the case of three peaks. FIG. 2A is a case in which a peak lower than the elution peak of lower crystalline component is present within a temperature range which is lower than the elution temperature of the elution peak of lower crystalline component, and FIG. 2B is a case in which a peak lower than the elution peak of lower crystalline component is present between the elution peak of higher crystalline component and the elution peak of lower crystalline component. In these drawings, 1 is the elution peak of higher crystalline component and 2 is the elution peak of lower crystalline component.

According to the invention, elution peak temperature of the lower crystalline component of the copolymer is from 45 to 85° C., preferably from 48 to 80° C. A peak temperature higher than the above range is not desirable, because it causes reduction of flexibility, transparency, pin hole resistance and film strength. Also, a peak temperature lower than the above range is not desirable, because it causes reduction of heat resistance.

(B2) H/M

Regarding the copolymer, when peak height of the lower crystalline component is defined as H and height of the minimum valley between the lower crystalline component peak and higher crystalline component peak is defined as M, in the elution curve obtained by its temperature rising elution fraction, H/M value is 9 or more. In this case, the minimum valley is a part where the height of the valley formed between the elution peak of lower crystalline component and elution peak of higher crystalline component peak becomes minimum. An H/M value of smaller than 9 is not desirable, because it causes reduction of transparency, pin hole resistance and film strength. In this connection, H and M are shown in FIGS. 1, 2A and 2B.

(B3) Area Ratio

In the copolymer, area ratio of elution peak temperature or less of the lower crystalline component is 35% or more based on the total area of the elution curve obtained by its temperature rising elution fraction. An area ratio of smaller than 35% is not desirable, because it causes reduction of flexibility, transparency, pin hole resistance and film strength. In this connection, the area ratio of elution peak temperature or less of the lower crystalline component is shown by shaded lines in FIGS. 1, 2A and 2B.

(B4) MFR

The copolymerhasanMFRvalueoffrom0.1 to 20 g/10 minutes, preferably from 0.1 to 15 g/10 minutes, more preferably from 0.1 to 10 g/10 minutes. The term MFR as used herein is a value measured in accordance with the procedure of JIS-K7210 (190° C., 2.16 kg loading). The MFR value when larger than the above range is not desirable, because heat resistance and film strength are reduced and film formation becomes unstable. On the other hand, the MFR value when smaller than the above range is not desirable, because the extrusion property is reduced due to increased resin pressure.

In this connection, though not particularly limited, the copolymer may have a density of preferably from 0.880 to 0.925 g/cm$^3$, more preferably from 0.885 to 0.920 g/cm$^3$, most preferably from 0.885 to 0.919 g/cm$^3$. The density within this range is desirable, because good flexibility and pin hole resistance can be obtained. In this connection, the term density as used herein is a value measured in accordance with the procedure of JIS-K7112.

As the copolymer of the invention which satisfies the physical properties (B1) to (B4), an ethylene-α-olefin copolymer capable of satisfying these physical properties (B1) to (B4) by itself (namely the ethylene-α-olefin copolymer simultaneously having the lower crystalline component and higher crystalline component) may be used alone, or the physical properties (B1) to (B4) may be satisfied by mixing two or more ethylene-α-olefin copolymers.

In addition, it is desirable that the copolymer has the physical property (B5) of Vicat softening temperature Tb within the range of from 65 to 125° C.

When an ethylene-(α-olefin copolymer capable of satisfying the physical properties (B1) to (B4) by itself is used, the copolymer is comprise of from 100 to 80 mol % of ethylene and from 0 to 20 mol % of a co-monomer α-olefin. For example, a polymer having desired physical properties can be obtained by optionally employing a method for adjusting polymerization temperature and amount of co-monomer, as a generally known method for controlling distribution of molecular weight and crystallinity.

Such an ethylene-α-olefin copolymer contains a constituting unit derived from ethylene, as the main component, and the α-olefin to be used as the co-monomer is a 1-olefin having from 3 to 18 carbon atoms. Illustrative examples of the 1-olefin include propylene, 1-butene, 1-pentene, 1-hexene, 1-octene, 1-heptene and 4-methyl-pentene-1,4-methyl-hexene-1,4,4-dimethylpentene-1. Illustrative examples of such an ethylene-α-olefin copolymer include an ethylene-1-butene copolymer, an ethylene-1-hexene copolymer and ethylene-1-octene copolymer.

The α-olefin to be used as a co-monomer is not limited to one kind, and a pluralistic copolymer composed of two or more co-monomers such as the case of a terpolymer can be included as a preferable example. Its illustrative examples include an ethylene-propylene-1-butene terpolymer.

When the physical properties (B1) to (B4) are satisfied by mixing two or more ethylene-α-olefin copolymers, it is desirable to use them as a resin mixture by mixing an ethylene-α-olefin copolymer having an elution peak temperature of from 45 to 85° C. in the temperature rising elution fraction (TREF) elution curve (lower crystalline component: component A) with another ethylene-α-olefin copolymer having an elution peak temperature higher than the former (higher crystalline component: component B).

Regarding the ethylene-α-olefin copolymers to be used as the component A (lower crystalline component) and component B (higher crystalline component) in the resin mixture, the ratio of ethylene to co-monomer and kind of the co-monomer are the same as the case of the ethylene-α-olefin copolymer capable of satisfying the physical properties (B1 to B4) by itself.

The component A has an MFR value of preferably from 0.1 to 20 g/10 minutes, more preferably from 0.1 to 15 g/10 minutes, and a density of preferably from 0.870 to 0.925 g/cm$^3$, more preferably from 0.880 to 0.920 g/cm$^3$. When the MFR value is within this range, it results in the advantage of being excellent in film strength and film formation stability, and when the density is within this range, it results in the advantage of being excellent in flexibility and pin hole resistance. Illustrative examples of such a component A include an ethylene-1-hexene copolymer and an ethylene-1-octene copolymer.

The component B has an MFR value of preferably from 0.1 to 50 g/10 minutes, more preferably from 0.5 to 40 g/10 minutes, and a density of preferably from 0.930 to 0.970 g/cm$^3$, more preferably from 0.935 to 0.968 g/cm$^3$. When theMFRvalue is within this range, film formation stability becomes good, and when the density is within this range, heat resistance becomes good. Illustrative examples of such a component B include an ethylene homopolymer and an ethylene-1-butene copolymer.

Formulation ratio of the component A with component B in the resinmixture is not particularly limited, but it is preferable to use the component A in an amount of from 98 to 55% by weight, more preferably from 95 to 60% by weight, and the component B in an amount of from 2 to 45% by weight, more preferably from 5 to 40% by weight, based on the total amount of the resin mixture.

Regarding the method for producing the ethylene-α-olefin copolymers (including a copolymer in the case of single use and the components A and B when they are made into a resin mixture), their polymerization method and catalyst are not particularly limited with the proviso that those which satisfy the physical properties can be produced.

Examples of the catalyst include a Ziegler type catalyst (based on the combination of a supported or non-supported halogen-containing titanium compound with an organic aluminum compound), a Phillips type catalyst (based on supported chromium (Cr$^{6+}$) oxide) and a Cumminsky type catalyst (based on the combination of a supported or non-supported metallocene compound with an organic aluminum compound, particularly alumoxane).

Examples of the metallocene compound include metallocene catalysts or metallocene/alumoxane catalysts described for example in JP-A-58-19309, JP-A-59-95292, JP-A-60-35005, JP-A-60-35006, JP-A-60-35007, JP-A-60-35008, JP-A-60-35009, JP-A-61-130314, JP-A-3-163088, European Patent 420,436, U.S. Pat. No. 5,055,438 and International Patent Publication WO 91/04257, or a catalyst disclosed for example in International Patent Publication WO 92/07123, which comprises a metallocene compound and a compound that becomes stable ion by reacting with the metallocene compound.

Regarding the ethylene-α-olefin copolymer having its elution peak at the high temperature side (higher crystalline component, component B) to be used in the resin mixture, the catalyst has no particular limitation so long as a product which satisfies the conditions can be obtained, and the product polymerized by any catalyst can exert the effects of the invention.

On the other hand, a copolymer which does not contain higher crystalline component and lower crystalline component but has a relatively narrow compositional distribution is desirable as the ethylene-α-olefin copolymer having its elution peak at the low temperature side (lower crystalline component, component A), so that it is desirable to use a Cumminsky type catalyst, namely a metallocene catalyst in which a metallocene compound containing a tetravalent transition metal is used. Its illustrative examples include mono-, di- or tri-cyclopentadienyl or substituted cyclopentadienyl metal compounds.

Examples of the polymerization method include a slurry method, a gas phase fluidized bed method (e.g., the method described in JP-A-59-23011), a solution method and a high pressure bulk polymerization method which is carried out under a pressure of 200 kg/cm$^2$ or more at a polymerization temperature of 100° C. or more, all of which being carried out in the presence of these catalyst.

Regarding illustrative production method of the ethylene-α-olefin copolymer of the invention, a method in which the copolymer is produced in a single reaction vessel is generally employed when an ethylene-α-olefin copolymer which satisfies the physical properties (B1) to (B4) by itself is used. Also, when a resin mixture of two or more components such as the components A and B is used as the ethylene-α-olefin copolymer, various methods can be employed, such as a method in which each component is produced in a single reaction vessel, a method in which two or more reaction vessels are connected, each component is polymerized in each vessel and a resin composition which satisfies the physical properties (B1) to (B4) is continuously produced, and a method in which each component is separately polymerized and then a resin mixture which satisfies the physical properties (B1) to (B4) is produced by formulating each component in accordance with a method similar to the usual resin composition production method.

More illustratively, the component A (lower crystalline component) and the component B (higher crystalline component) may be dry-blended in advance, and the blend is directly put into the hopper of a molding machine. Also, a film or sheet can be produced by a method in which the blend is melted and kneaded using an extruder, a Brabender plastograph, a Banbury mixer or a kneader blender and then made into pellets by a generally used method.

The polyethylene resin material which constitutes the intermediate layer may be composed solely of the main component ethylene-α-olefin copolymer, but it may be further formulated with an auxiliary additive component which is generally used in resin compositions, as occasion demands within such a range that it does not significantly spoil the effects of the invention.

Examples of such an auxiliary additive component include an antioxidant, an anti-blocking agent, a neutralizing agent and a heat stabilizing agent. Preferred examples of the antioxidant include phenol-based and phosphorus-based antioxidants.

When a resin mixture of the component A having its elution peak a the low temperature side and component B having its elution peak at the high temperature side is used as the main component, the auxiliary additive component can be formulated in either one or both of the components before, during or after mixing of the two components.

In addition, in order to improve bubble stability at the time of molding and/or improve transparency, from 3 to 40% by weight of a high-pressure low density polyethylene (HP-LDPE), or/and, in order to provide flexibility, from 3 to 75% by weight of a crystalline ethylene-α-olefin copolymer and/or a rubber compound such as EBR, EPR or the like ethylene-α-olefin elastomer or SEBS, HSBC or the like styrene elastomer may be formulated within such a range that they do not spoil the effects of the invention, based on the total weight of the ethylene-α-olefin copolymer alone or a resin mixture of the component A having its elution peak a the low temperature side and component B having its elution peak at the high temperature side.

(3) Inner Layer

According to the first embodiment of the invention, an inner layer is preferably arranged.

Though material of the inner layer of the multi-layer film of the first embodiment of the invention is not particularly limited, a resin material selected from the group consisting of (i) a polypropylene resin, (ii) a high-pressure low density polyethylene having an extrapolation melting completion temperature of melting peak, obtained by a differential scanning calorimetry (DSC), of 110° C. or more, and (iii) a copolymer of ethylene with an α-olefin having from 3 to 18 carbon atoms, having a density of 0.920 g/cm$^3$ or more measured in accordance with the procedure of JIS-K7112, is preferably used.

The polypropylene resin as the component (i) can be selected from the polypropylene resins to be used in the outer layer.

Regarding the component (ii), namely a high-pressure low density polyethylene having an extrapolation melting completion temperature of melting peak, obtained by a differential scanning calorimetry (DSC), of 110° C. or more, its MFR is not particularly limited, but is preferably from 0.05 to 100 g/10 minutes, more preferably from 0.1 to 80 g/10 minutes, most preferably from 0.2 to 70 g/10 minutes. The term MFRasused herein is a valuemeasured in accordance with the procedure of JIS-K7210 (190° C., 2.16 kg loading). The MFR value within this range has an advantage in that the film formation is stabilized. Also, though not particularly limited, the density is preferably from 0.915 to 0.940 g/cm$^3$, more preferably from 0.920 to 0.935 g/cm$^3$. The density within this range has an advantage in that excellent heat resistance and flexibility can be obtained. In this connection, the term density as used herein is a value measured in accordance with the procedure of JIS-K7112.

Examples of the copolymer of ethylene with an α-olefin having from 3 to 18 carbon atoms, as the component (iii), include those which are produced using a Ziegler type catalyst, those which are produced using a Cumminsky type catalyst (excluding those which correspond to the component B to be used in the intermediate layer) and those which have a density of 0.920 g/cm$^3$ or more, selected from ethylene-α-olefin copolymers which satisfy the physical properties (B1) to (B4) similar to those which are exemplified as the ethylene-α-olefin copolymers that can be used in the intermediate layer (including the copolymer which satisfies the physical properties (B1) to (B4) by itself and the resin mixture in which the physical properties (B1) to (B4) are satisfied by mixing the component A with the component B).

MFR of the component (iii) is not particularly limited, but is preferably from 0.05 to 100 g/10 minutes, more preferably from 0.1 to 80 g/10 minutes, most preferably from 0.2 to 70 g/10 minutes. The term MFR as used herein is a value measured in accordance with the procedure of JIS-K7210 (190° C., 2.16 kg loading). The MFR value within this range has an advantage in that the film formation is stabilized. Also, the density is more preferably from 0.915 to 0.940 g/cm$^3$, most preferably from 0.920 to 0.935 g/cm$^3$. The density within this range has an advantage in that excellent heat resistance, flexibility and transparency can be obtained. In this connection, the term density as used herein is a value measured in accordance with the procedure of JIS-K7112.

Illustrative examples of such a resin material for inner layer use include a propylene-ethylene random copolymer, an ethylene-1-butene copolymer, an ethylene-1-hexene copolymer and a high-pressure low density polyethylene.

In addition, in order to improve bubble stability at the time of molding and/or improve transparency, from 3 to 40% by weight of a high-pressure low density polyethylene (HP-LDPE), or/and, in order to provide flexibility and/or improve inter layer adhesive property, from 3 to 75% by weight of a crystalline ethylene-α-olefin copolymer polymerized using a Ziegler type or metallocene type catalyst and/or a rubber compound such as EBR, EPR or the like ethylene-α-olefin elastomer or SEBS, HSBC or the like styrene elastomer may be formulated in the resin material to be used in the inner layer, based on the total weight of the resin material, within such a range that they do not spoil the effects of the invention.

(4) Laminate and Medical Bag

The multi-layer film of the first embodiment of the invention contains the outer layer, intermediate layer and inner layer in that order, but, in addition to these outer layer, intermediate layer and inner layer, generally used various layers can be arranged to the multi-layer film as occasion demands. Illustratively, an adhesive layer or an EVOH or the like gas barrier layer can be arranged between respective layers.

Examples of the method for obtaining the multi-layer film include a water cooling or air cooling type co-extrusion inflation method, a co-extrusion T-die method, a dry lamination method and an extrusion lamination method. The multi-layer film is generally in the shape of tubes or sheets, and the medical bag of the interest can be obtained by superposing them, making them into a bag of predetermined shape and dimension by a heat sealing or the like method and then attaching an inlet thereto.

Thickness of the multi-layer film is preferably from 0.1 to 0.7 mm, more preferably from 0.15 to 0.6 mm. The thickness if less than 0.1 mm would spoil the mass feeling. On the other hand, its thickness if exceeding 0.7 mm would cause insufficient flexibility. Also, the thickness ratio of each layer is not particularly limited, but, in order to provide the multi-layer film with sufficient flexibility, it is desirable to set the intermediate layer to a thickness of 50% or more, preferably 60% or more, more preferably from 98 to 65%, of the entire multi-layer film thickness, and the inner layer to a thickness of from 1 to 30% and the outer layer to a thickness of from 1 to 20%. When the thickness ratios of inner and outer layers based on the thickness of the entire multi-layer film exceed these respective ranges, flexibility of the multi-layer film becomes insufficient. Also, when the thickness of each of the inner and outer layers is less than 0.01 mm, heat resistance becomes poor.

The multi-layer film of the first embodiment of the invention can be used for example in a medical bag or a food packing bag. Illustrative use of the medical bag include infusion bags, containers for injection, discharge, preservation and the like of, for example, body fluids and drug solutions, peritoneum dialysis bags and artificial dialysis bags. Examples of the food packing bag include bags for retort pouch food use.

The second embodiment of the invention is described in the following.

I. Inner Layer

The inner layer of the second embodiment of the invention uses a copolymer of ethylene with an α-olefin having from 3 to 18 carbon atoms (to be referred to as "ethylene-α-olefin copolymer" or simply "copolymer" hereinafter) as the main componentandhasphysical properties (B1) to (B4) and, preferably, (5).

1. Physical Properties of the Copolymer of Ethylene with an α-olefin Having from 3 to 18 Carbon Atoms (1) Physical Property (B1): Peak Temperature of Elution Curve by Temperature Rising Elution Fraction According to the copolymer to be used in the inner layer of the multi-layer film of the invention, elution peak temperature of the lower crystalline component of its elution curve obtained by temperature rising elution fraction (TREF) is from 45 to 85° C., preferably from 48 to 80° C. A peak temperature higher than the above range is not desirable, because it causes reduction of flexibility, transparency, pin hole resistance and film strength. Also, a peak temperature lower than the above range is not desirable, because it causes reduction of heat resistance.

(2) Physical Property (B2): H/M by TREF

Regarding the copolymer to be used in the inner layer of the multi-layer film of the invention, when peak height of the lower crystalline component is defined as H and height of the minimum valley between the lower crystalline component peak and higher crystalline component peak is defined as M, in the elution curve obtained by its temperature rising elution fraction (TREF), H/M value is 9 or more. In this case, the minimum valley is a part where the height of the valley formed between the elution peak of lower crystalline component and elution peak of higher crystalline component peak becomes minimum. An H/M value of smaller than 9 is not desirable, because it causes reduction of transparency, pin hole resistance and film strength. In this connection, H and M are shown in FIGS. 1, 2A and 2B.

(3) Physical Property (B3): Area Ratio by TREF

In the copolymer to be used in the inner layer of the multi-layer film of the invention, area ratio of elution peak temperature or less of the lower crystalline component is 35% or more based on the total area of the elution curve obtained by its temperature rising elution fraction (TREF). An area ratio of smaller than 35% is not desirable, because it causes reduction of flexibility, transparency, pin hole resistance and film strength. In this connection, the area ratio of elution peak temperature or less of the lower crystalline component is shown by shaded lines in FIGS. 1, 2A and 2B.

In this connection, the temperature rising elution fraction (TREF) is a method in which a polymer is once completely dissolved at a high temperature and then cooled, thereby effecting formation of a thin polymer layer on the surface of an inert carrier, the temperature is increased continuously or stepwise to recover the eluted component (polymer), and its concentration is continuously detected to calculate amount and elution temperature of the eluted component.

A graph drawn by the elution fraction and elution temperature is the elution curve by which a compositional distribution (distribution of molecular weight and crystallinity) of the polymer can be measured. Details such as of the measuring method of the temperature rising elution fraction (TREF) and apparatus are described in *Journal of Applied Polymer Science*, vol. 26, pp. 4217–4231 (1981).

Shape of the elution curve obtained by TREF varies depending on the distribution of molecular weight and crystallinity of the polymer. For example, there are a curve of one peak, a curve of two peaks and a curve of three peaks, and the curve of two peaks is divided into certain cases such as a case in which the peak having high elution temperature has large elution fraction (peak height is high) in comparison with the peak having low elution temperature and a case in which the peak having high elution temperature has small elution fraction (peak height is low) in comparison with the peak having low elution temperature.

Since the copolymer to be used in the invention contains at least a lower crystalline component and a higher crystalline component, it has at least two peaks (elution peaks) in the elution curve. In the case of two peaks, the peak having high elution temperature is the elution peak of higher crystalline component and the peak having low elution temperature is the elution peak of lower crystalline component.

The copolymer is not particularly limited, with the proviso that it has at least two elution peaks, for example, it may have three or more elution peaks. In that case, the peak having the highest elution temperature among the elution peaks is the elution peak of higher crystalline component, and the peak having the highest height among peaks of lower elution temperature than the elution peak of the higher crystalline component is the elution peak of lower crystalline component. In consequence, a peak having lower height than the elution peak of lower crystalline component may be present within a temperature range which is lower than the elution temperature of the elution peak of lower crystalline component, and a peak having lower height than the elution peak of lower crystalline component may be present between the elution peak of higher crystalline component and the elution peak of lower crystalline component. Also, a peak having lower height than the elution peak of lower crystalline component may be present both within the temperature range lower than the elution temperature of the elution peak of lower crystalline component and in a temperature range between the elution peak of higher crystalline component and the elution peak of lower crystalline component.

These cases are illustratively described with reference to the drawings. FIG. 1 is an elution curve in the case of two peaks, and FIG. 2A and 2B are elution curves in the case of three peaks. FIG. 2A is a case in which a peak lower than the elution peak of lower crystalline component is present within a temperature range which is lower than the elution temperature of the elution peak of lower crystalline component, and FIG. 2B is a case in which a peak lower than the elution peak of lower crystalline component is present between the elution peak of higher crystalline component and the elution peak of lower crystalline component. In these drawings, 1 is the elution peak of higher crystalline component and 2 is the elution peak of lower crystalline component.

(4) Physical Property (B4): Melt Flow Rate

The copolymer to be used in the invention has a melt flow rate (to be referred to as "MFR" hereinafter) of from 0.1 to 20 g/10 minutes, preferably from 0.1 to 15 g/10 minutes, more preferablyfrom0.1 to 10 g/10minutes. The termMFRasusedherein is a value measured in accordance with the procedure of JIS-K7210 (190° C., 2.16 kg loading). The MFR value when larger than the above range is not desirable, because heat resistance and film strength are reduced and film formation becomes unstable. On the other hand, the MFR value when smaller than the above range is not desirable, because the extrusion property is reduced due to increased resin pressure.

(5) Physical Property (B5): Vicat Softening Temperature

The copolymer to be used in the inner layer of the multi-layer film of the invention has a Vicat softening temperature Tb of preferably from 65 to 125° C., more preferably from 70 to 120° C. The Vicat softening temperature Tb if exceeding the above range would cause reduction of flexibility, transparency, pin hole resistance and film strength. Also, the peak temperature if less than the above range would worsen heat resistance.

(6) Density

In this connection, though not particularly limited, the copolymer may have a density of preferably from 0.880 to 0.930 g/cm³, more preferably from 0.885 to 0.925 g/cm³. The density within this range is desirable, because good flexibility, pin hole resistanceand film strength can beobtained. In this connection, the term density as used herein is a value measured in accordance with the procedure of JIS-K7112.

2. Ethylene-α-olefin Copolymer

As the copolymer of the invention which satisfies the physical properties (B1) to (B5), an ethylene-α-olefin copolymer capable of satisfying these physical properties (B1) to (B5) by itself (namely the ethylene-α-olefin copolymer simultaneously having the lower crystalline component and higher crystalline component) may be used alone, or the physical properties (B1 to B5) may be satisfied by mixing two or more ethylene-α-olefin copolymers.

When an ethylene-α-olefin copolymer capable of satisfying the physical properties (B1) to (B5) by itself is used, the copolymer is preferably comprise of 80 mol % or more of ethylene and 20 mol % or less of a co-monomer α-olefin. For example, a polymer having desired physical properties can be obtained by optionally employing a method for adjusting polymerization temperature and amount of co-monomer, as a generally known method for controlling distribution of molecular weight and crystallinity.

Such an ethylene-α-olefin copolymer contains a constituting unit derived from ethylene, as the main component, and the α-olefin to be used as the co-monomer is a 1-olefin having from 3 to 18 carbon atoms. Illustrative examples of the 1-olefin include propylene, 1-butene, 1-pentene, 1-hexene, 1-octene, 1-heptene and 4-methyl-pentene-1,4-methyl-hexene-1,4,4-dimethylpentene-1. Illustrative examples of such an ethylene-α-olefin copolymer include an ethylene-1-butene copolymer, an ethylene-1-hexene copolymer and ethylene-1-octene copolymer.

The α-olefin to be used as a co-monomer is not limited to one kind, and a pluralistic copolymer composed of two or more co-monomers such as the case of a terpolymer can be included as a preferable example. Its illustrative examples include an ethylene-propylene-1-butene terpolymer.

When the physical properties (B1) to (B5) are satisfied by mixing two or more ethylene-α-olefin copolymers, it is desirable to use them as a resin mixture by mixing an ethylene-α-olefin copolymer having an elution peak temperature of from 45 to 85° C. in the temperature rising elution fraction (TREF) elution curve (lower crystalline component: component A) with another ethylene-α-olefin copolymer having an elution peak temperature higher than the former (higher crystalline component: component B).

Regarding the ethylene-α-olefin copolymers to be used as the component A (lower crystalline component) and component B (higher crystalline component) in the resin mixture, the ratio of ethylene to co-monomer and kind of the co-monomer are the same as the case of the ethylene-α-olefin copolymer capable of satisfying the physical properties (B1) to (B5) by itself.

The component A has an MFR value of preferably from 0.1 to 20 g/10 minutes, more preferably from 0.1 to 15 g/10 minutes, and a density of preferably from 0.870 to 0.930 g/cm³, more preferably from 0.880 to 0.925 g/cm³. When the MFR value is within this range, it results in the advantage of being excellent in film strength and film formation stability, and when the density is within this range, it results in the advantage of being excellent in blocking resistance, heat resistance, flexibility and pin hole resistance. Illustrative examples of such a component A include an ethylene-1-hexene copolymer and an ethylene-1-octene copolymer.

The component B has an MFR value of preferably from 0.1 to 50 g/10 minutes, more preferably from 0.5 to 40 g/10 minutes, and a density of preferably from 0.930 to 0.970 g/cm³, more preferably from 0.935 to 0.968 g/cm³. When the MFR value is within this range, film formation stability becomes good, and when the density is within this range, heat resistance becomes good. Illustrative examples of such a component B include an ethylene homopolymer and an ethylene-1-butene copolymer.

Formulation ratio of the component A with component B in the resin mixture is not particularly limited, but it is preferable to use the component A in an amount of from 98 to 45% by weight, more preferably from 95 to 50% by weight, and the component B in an amount of from 2 to 55% by weight, more preferably from 5 to 50% by weight, based on the total amount of the resin mixture.

3. Production Method of Ethylene-α-olefin Copolymer

Regarding the method for producing the ethylene-α-olefin copolymers (including a copolymer in the case of single use and the components A and B when they are made into a resin mixture), their polymerization method and catalyst are not particularly limited with the proviso that those which satisfy the physical properties can be produced.

Examples of the catalyst include a Ziegler type catalyst (based on the combination of a supported or non-supported halogen-containing titanium compound with an organic aluminum compound), a Phillips type catalyst (based on supported chromium ($Cr^{6+}$) oxide) and a Cumminsky type catalyst (based on the combination of a supported or non-supported metallocene compound with an organic aluminum compound, particularly alumoxane).

Examples of the metallocene compound include metallocene catalysts or metallocene/alumoxane catalysts described for example in JP-A-58-19309, JP-A-59-95292, JP-A-60-35005, JP-A-60-35006, JP-A-60-35007, JP-A-60-35008, JP-A-60-35009, JP-A-61-130314, JP-A-3-163088, European Patent 420,436, U.S. Pat. No. 5,055,438 and International Patent Publication WO 91/04257, or a catalyst disclosed for example in International Patent Publication WO 92/07123, which comprises a metallocene compound and a compound that becomes stable ion by reacting with the metallocene compound.

Regarding the ethylene-α-olefin copolymer having its elution peak at the high temperature side (higher crystalline component, component B) to be used in the resin mixture, the catalyst has no particular limitation so long as a product which satisfies the conditions can be obtained, and the product polymerized by any catalyst can exert the effects of the invention.

On the other hand, a copolymer which does not contain higher crystalline component and lower crystalline component but has a relatively narrow compositional distribution is desirable as the ethylene-α-olefin copolymer having its elution peak at the low temperature side (lower crystalline component, component A), so that it is desirable to use a Cumminsky type catalyst, namely a metallocene catalyst in which a metallocene compound containing a tetravalent transition metal is used.

Examples of the metallocene compound to be used in the Cumminsky type catalyst include organic transition metal compounds of Zr, Ti, Hf or the like group IV to VI transition metal compound, particularly a group IV transition metal compound, with a cyclopentadiene or a cyclopentadiene derivative.

Examples of the useful cyclopentadiene derivative include pentamethylcyclopentadiene which is substituted with an alkyl or on which a saturated or unsaturated cyclic substituent group is formed through binding of two or more substituent groups, typically including indene, flubrene and azulene or partially hydrogenated products thereof.

Also useful are those in which a plurality of cyclopentadiene groups are connected by an alkylene group or a silylene group.

As the co-catalyst, a compound which becomes stable ion by reacting with an organic aluminum or a metallocene catalyst can be used, and almoxane is generally used.

Examples of the polymerization method include a slurry method, a gas phase fluidized bed method (e.g., the method described in JP-A-59-23011), a solution method and a high pressure bulk polymerization method which is carried out under a pressure of 200 kg/cm$^2$ or more at a polymerization temperature of 100° C. or more, all of which being carried out in the presence of these catalyst.

Regarding illustrative production method of the ethylene-α-olefin copolymer of the invention, a method in which the copolymer is produced in a single reaction vessel is generally employed when an ethylene-α-olefin copolymer which satisfies the physical properties (B1) to (B5) by itself is used. Also, when a resin mixture of two or more components such as the components A and B is used as the ethylene-α-olefin copolymer, various methods can be employed, such as a method in which each component is produced in a single reaction vessel, a method in which two or more reaction vessels are connected, each component is polymerized in each vessel and a resin composition which satisfies the physical properties (B1) to (B5) is continuously produced, and a method in which each component is separately polymerized and then a resin mixture which satisfies the physical properties (B1) to (B5) is produced by formulating each component in accordance with a method similar to the usual resin composition production method.

More illustratively, the component A (lower crystalline component) and the component B (higher crystalline component) may be dry-blended in advance, and the blend is directly put into the hopper of a molding machine. Also, a film or sheet can be produced by a method in which the blend is melted and kneaded using an extruder, a Brabender plastograph, a Banbury mixer or a kneader blender and then made into pellets by a generally used method.

4. Auxiliary Additive Component

The polyethylene resin material which constitutes the inner layer may be composed solely of the main component ethylene-α-olefin copolymer, but it may be further formulated with an auxiliary additive component which is generally used in resin compositions, as occasion demands within such a range that it does not significantly spoil the effects of the invention.

Examples of such an auxiliary additive component include an antioxidant, an anti-blocking agent, a neutralizing agent and a heat stabilizing agent. Preferred examples of the antioxidant include phenol-based and phosphorus-based antioxidants.

When a resin mixture of the component A having its elution peak a the low temperature side and component B having its elution peak at the high temperature side is used as the main component, the auxiliary additive component can be formulated in either one or both of the components before, during or after mixing of the two components.

In addition, in order to improve interlayer adhesive property, a resin material selected from the group consisting of a polypropylene resin, a high-pressure low density polyethylene and a copolymer of ethylene with an α-olefin having from 3 to 18 carbon atoms, used in the outer layer, may be formulated in an amount of from 3 to 40% by weight but within such a range that it does not spoil the effects of the invention, based on the total weight of the ethylene-α-olefin copolymer alone or a resin mixture of the component A having its elution peak a the low temperature side and component B having its elution peak at the high temperature side.

Also, in order to provide flexibility, a crystalline ethylene-α-olefin copolymer and/or a rubber compound such as EBR, EPR or the like ethylene-α-olefin elastomer or SEBS, HSBC or the like styrene elastomer may be formulated in an amount of from 3 to 75% by weight.

II. Outer Layer

1. Physical Properties of Polyolefin Resin (1) Vicat Softening Temperature

A material in which its Vicat softening temperature Ta satisfies a condition Tb (Vicat softening temperature of inner layer)<Ta≦140° C. is used as the polyolefin resin material of the outer layer of the multi-layer film of the second embodiment of the invention. When the Vicat softening temperature Ta of the outer layer polyolefin resin material is equal to or lower than the Vicat softening temperature Tb of the inner layer copolymer, the working efficiency is reduced due to taking of the outer layer side by a seal bar (adhesion of the outer layer to the upper side seal bar) at the time of bag making (hot melting of inner and outer layers by seal bar). Also, the Vicat softening temperature Ta of the outer layer polyolefin resin material exceeding 140° C. is not desirable, because it entails insufficient flexibility.

2. Polyolefin Resin

The polyolefin resin material of the outer layer is not particularly limited so long as its Vicat softening temperature Ta can satisfy the range, but it is preferably a polyolefin resin material selected from the group consisting of (i) a polypropylene resin, (ii) a high-pressure low density polyethylene having an extrapolation melting completion temperature of melting peak, obtained by a differential scanning calorimetry (DSC), of 110° C. or more, and (iii) a copolymer of ethylene with an α-olefin having from 3 to 18 carbon atoms, having a density of 0.910 g/cm³ or more measured in accordance with the procedure of JIS-K7112.

(i) Polypropylene Resin

Illustrative examples of the polypropylene resin as the component (i) include a propylene homopolymer and a random copolymer of propylene with ethylene or an α-olefin having 4 or more carbon atoms. Examples of the α-olefin having 4 or more carbon atoms include 1-butene, 1-pentene, 1-hexene, 1-octene, 1-heptene and 4-methyl-pentene-1,4-methyl-hexene-1,4,4-dimethylpentene-1. In the random copolymer, ratio of the constituting unit derived from propylene (propylene unit) is preferably 80% by weight or more; particularly preferably 85% by weight or more.

MFR of the polypropylene resin is not particularly limited, but it is preferably from 0.1 to 100 g/10 minutes, particularly preferably from 0.3 to 80 g/10 minutes. The term MFR as used herein is a value measured in accordance with the procedure of JIS-K6758 (230° C., 2.16 kg loading). The MFR value within the above range exerts an advantage in that the formed membrane is stabilized.

Illustrative examples of such a polypropylene resin include a propylene-ethylene random copolymer, a propylene-1-butene copolymer and a propylene-ethylene-1-butene copolymer.

In addition, in order to provide flexibility or/and improve interlayer adhesive property, a crystalline ethylene-α-olefin copolymer polymerized using a Ziegler type or metallocene catalyst and/or a rubber compound such as EBR, EPR or the like ethylene-α-olefin elastomer or SEBS, HSBC (a hydrogenated styrene block copolymer) or the like styrene elastomer may be formulated in an amount of from 3 to 75% by weight, within such a range that the effects of the invention are not spoiled, based on the total weight of the polypropylene resin.

Also, in order to improve interlayer adhesion property, the copolymer of ethylene with an α-olefin having from 3 to 18 carbon atoms, that contains a lower crystalline component and a higher crystalline component and is used in the inner layer, can be formulated in an amount of from 3 to 40% by weight, within such a range that the effects of the invention are not spoiled, based on the total weight of the polypropylene resin.

(ii) High-pressure Low Density Polyethylene

Regarding the component (ii), namely a high-pressure low density polyethylene having an extrapolation melting completion temperature of melting peak, obtained by a differential scanning calorimetry (DSC), of 110° C. or more, its MFR is not particularly limited, but is preferably from 0.05 to 100 g/10 minutes, more preferably from 0.1 to 80 g/10 minutes, most preferably from 0.2 to 70 g/10 minutes. The termMFRasused herein is avaluemeasured in accordance with the procedure of JIS-K7210 (190° C., 2.16 kg loading). The MFR value within this range has an advantage in that the film formation is stabilized. Also, though not particularly limited, the density is preferably from 0.915 to 0.940 g/cm³, more preferably from 0.920 to 0.935 g/cm³. The density within this range has an advantage in that excellent heat resistance and flexibility can be obtained. In this connection, the term density as used herein is a value measured in accordance with the procedure of JIS-K7112.

In addition, in order to provide flexibility or/and improve interlayer adhesive property, a crystalline ethylene-α-olefin copolymer polymerized using a Ziegler type or metallocene catalyst and/or a rubber compound such as EBR, EPR or the like ethylene-α-olefin elastomer or SEBS, HSBC (a hydrogenated styrene block copolymer) or the like styrene elastomer may be formulated in an amount of from 3 to 75% by weight, within such a range that the effects of the invention are not spoiled, based on the total weight of the high-pressure low density polypropylene.

Also, in order to improve interlayer adhesion property, the copolymer of ethylene with an α-olefin having from 3 to 18 carbon atoms, that contains a lower crystalline component and a higher crystalline component and is used in the inner layer, can be formulated in an amount of from 3 to 40% by weight, within such a range that the effects of the invention are not spoiled, based on the total weight of the high-pressure low density polypropylene.

(iii) Copolymer of Ethylene with an α-olefin having from 3 to 18 Carbon Atoms

Examples of the copolymer of ethylene with an α-olefin having from 3 to 18 carbon atoms, as the component (iii), include those which are produced using a Ziegler type catalyst, those which are produced using a Cumminsky type catalyst (excluding those which correspond to the component B to be used in the inner layer) and those in which the Vicat softening temperature is higher than the Vicat softening temperature of the copolymer used in the inner layer and 140° C. or less, selected from ethylene-α-olefin copolymers which satisfy the physical properties (B1) to (B5) similar to those which are exemplified as the ethylene-α-olefin copolymers that can be used in the inner layer (including the copolymer which satisfies the physical properties (B1) to (B5) by itself and the resin mixture in which the physical properties (B1) to (B5) are satisfied by mixing the component A with the component B).

MFR of the component (iii) is not particularly limited, but is preferably from 0.05 to 100 g/10 minutes, more preferably from 0.1 to 80 g/10 minutes, most preferably from 0.2 to 70 g/10 minutes. The term MFR as used herein is a value measured in accordance with the procedure of JIS-K7210 (190° C., 2.16 kg loading). The MFR value within this range has an advantage in that the film formation is stabilized. Also, the density is more preferably from 0.910 to 0.940 g/cm³, most preferably from 0.910 to 0.935 g/cm³. The density within this range has an advantage in that excellent heat resistance, flexibility and transparency can be obtained. In this connection, the term density as used herein is a value measured in accordance with the procedure of JIS-K7112.

In addition, in order to provide flexibility or/and improve interlayer adhesive property, a crystalline ethylene-α-olefin copolymer polymerized using a Ziegler type or metallocene catalyst and/or a rubber compound such as EBR, EPR or the like ethylene-α-olefin elastomer or SEBS, HSBC (a hydrogenated styrene block copolymer) or the like styrene elastomer may be formulated in an amount of from 3 to 75% by weight, within such a range that the effects of the invention are not spoiled, based on the total weight of the copolymer of ethylene with an α-olefin having from 3 to 18 carbon atoms.

Also, in order to improve interlayer adhesion property, the copolymer of ethylene with an α-olefin having from 3 to 18 carbon atoms, that contains a lower crystalline component and a higher crystalline component and is used in the inner layer, can be formulated in an amount of from 3 to 40% by weight, within such a range that the effects of the invention are not spoiled, based on the total weight of the copolymer of ethylene with an α-olefin having from 3 to 18 carbon atoms.

Illustrative examples of such a copolymer of ethylene with an α-olefin having from 3 to 18 carbon atoms include an ethylene-1-butene copolymer, an ethylene-1-hexene copolymer and an ethylene-1-octene copolymer.

III. Laminate and Medical Bag

The multi-layer film of the second embodiment of the invention contains the outer layer and inner layer in that order, but, in addition to these outer layer and inner layer, generally used various layers can be arranged to the multi-layer film as occasion demands, so that it may be a multi-layer film of three, four or more layers.

Illustrative examples of the generally used layers include a polyolefin resin material, an adhesive resin, rubber, polyamide, polyester and EVOH.

Examples of the method for obtaining the multi-layer film include a water cooling or air cooling type co-extrusion inflation method, a co-extrusion T-die method, a dry lamination method and an extrusion lamination method. The multi-layer film is generally in the shape of tubes or sheets, and the medical bag of the interest can be obtained by superposing them, making them into a bag of predetermined shape and dimension by a heat sealing or the like method and then attaching an inlet thereto.

Thickness of the multi-layer film is preferably from 0.1 to 0.7 mm, more preferably from 0.15 to 0.6 mm. The thickness if less than 0.1 mm would spoil the mass feeling. On the other hand, its thickness if exceeding 0.7 mm would cause insufficient flexibility. Also, the thickness ratio of each layer is not particularly limited, but, in order to provide the multi-layer film with sufficient flexibility, it is desirable to set the inner layer to a thickness of 50% or more, preferably 55% or more, more preferably from 98 to 60%, of the entire multi-layer film thickness, and the outer layer to a thickness of from 1 to 50%. When the thickness ratio of outer layer based on the thickness of the entire multi-layer film exceeds the above range, flexibility of the multi-layer film becomes insufficient. Also, when the thickness of the outer layer is less than 0.01 mm, it tends to adhere to the upper side seal bar.

The medical bag of the invention comprises the multi-layer film. Illustrative use of the medical bag include infusion bags, containers for injection, discharge, preservation and the like of, for example, body fluids and drug solutions, peritoneum dialysis bags and artificial dialysis bags.

Also, since the multi-layer film of the invention is excellent in transparency, flexibility, heat resistance and bag drop strength, it can also be used suitably as food packing bags (e.g., for semi-retort and retort pouch food use).

EXAMPLES

The following illustratively describes the invention with reference to examples, but the invention is not limited to these examples. In this connection, measurement of respective physical properties of resins and molding and evaluation of multi-layer films in these inventive and comparative examples were carried out by the following methods.

1. Measurement of Physical Property of Resin (1) MFR

MFR of ethylene-α-olefin copolymer and high-pressure low density polyethylene was measured in accordance with the procedure of JIS-K7210 (190° C., 2.16 kg loading). MFR of polypropylene resin was measured in accordance with the procedure of JIS-K6758 (230° C., 2.16 kg loading).

(2) Measurement of Elution Curve Obtained by TREF

Measurement of elution curve obtained by TREF according to the invention was carried out in the following manner. This was carried out using a cross fractionation apparatus (CFC-T150A, mfd. by Mitsubishi Chemical Corporation) as the measuring apparatus and in accordance with the measuring method of the attached operation manual. This cross fractionation apparatus is an apparatus in which a temperature rising elution fraction (TREF) mechanism for fractionating a sample making use of a difference in dissolution temperature is connected by on-line to a size exclusion chromatography (SEC) for further fractionating the fractionated fractions based on the molecular size.

Firstly, using a solvent (o-dichlorobenzene), a sample to be measured (ethylene-α-olefin copolymer) was dissolved at 140° C. to a concentration of 4 mg/ml, and the solution was injected into a sample loop in the measuring apparatus. The following measurement was automatically carried out in accordance with the setting conditions.

A 0.4 ml portion of the sample solution kept in the sample loop was injected into a TREF column (an accessory stainless column of the apparatus, 4 mm in inner diameter and 150 mm in length, packed with glass beads as an inert carrier) which fractionate the sample making use of a difference in the dissolution temperature. The sample was cooled from 140° C. to 0° C. at a rate of 1° C./minute and coated on the inert carrier. During this period, polymer layers are formed on the inert carrier surface from higher crystalline component (easily crystallized) to lower crystalline component (hardly crystallized) in that order. After 30 minutes of retention of the TREF column at 0° C., 2 ml of the component dissolved at a temperature of 0° C. was injected into an SEC column system (AD80M-S, three columns, mfd. by Showa Denko) from the TREF column at a flow rate of 1 ml/minute. While molecular size fractionation was carried out by the SEC, the TREF column was heated to the next elution temperature (5° C.) and kept at the same temperature for about 30 minutes. Measurement of each elution fraction by SEC was carried out at intervals of 39 minutes. The following temperatures were used as the elution temperature and increased stepwise.

Elution temperature (° C.): 0, 5, 10, 15, 20, 25, 30, 35, 40, 45, 49, 52, 55, 58, 61, 64, 67, 70, 73, 76, 79, 82, 85, 88, 91, 94, 97, 100, 102, 120, 140° C.

Using each of the solutions fractionated by the SEC column based on the molecular size, the absorbance proportional to the polymer concentration was measured by an infrared spectrometer attached to the apparatus (wavelength 3.42 pm, detection by stretching vibration of methylene) to obtain chromatogram of each elution temperature fraction. Using theintegrated data treating software, base line of the chromatogram of each elution temperature fraction obtained by the above measurement was drawn to carry out arithmetic processing. The area of each chromatogram was integrated and an integrated elution curve was calculated. Also, the integrated elution curve was differentiated by temperature to calculate a differentiated elution curve. Drawing of the results of calculation was output by a printer. Drawing of the thus output differentiated elution curve was carried out by plotting 89.3 mm per 100° C. of the elution temperature as abscissa and 76.5 mm per 0.1 of the differentiated amount (elution fractionation ratio: total integrated elution amount was defined as 1.0, and changed amount of 1° C. was defined as the differentiated amount) as ordinate.

Next, based on the differentiated elution curve, the peak of the most highest temperature side was used as the elution peak of higher crystalline component, and the maximum peak of the lower temperature side was used as the elution peak of lower crystalline component. Also, the H/M value was calculated by defining the peak height of the low temperature side as H, and the height of the minimum valley between the lower crystalline component elution peak and higher crystalline component elution peak as M. Next, area ratio of elution peak temperature or less of the lower crystalline component was calculated based on the total area.

(3) Density

This was measured in accordance with the procedure of JIS-K7112.

(4) Extrapolation Melting Completion Temperature of Melting Peak by DSC

About 5 mg of a sample was weighed out from a film of 100 μm formed by hot press, arranged in an RDC-220-DSC apparatus manufactured by Seiko Denshi Kogyo, heated to 70° C., kept at the same temperature for 5 minutes and then cooled −10° C. at a programming rate of 10° C./minute. Next, this was kept at −10° C. for 1 minute and then heated to 170° C. at a programming rate of 10° C./minute to carry out DSC measurement, thereby obtaining a DSC curve of from −10° C. to 170° C. In accordance with the procedure of JIS-K7121, the high temperature side base line of the DSC curve was extended to the low temperature side, and a tangent line was drawn at the point where the slope of the high temperature side curve of the melting peak became maximum, and the temperature of the point of intersection of these lines was used as the extrapolation melting completion temperature.

(5) Vicat Softening Temperature

This was measured in accordance with the procedure of JIS-K7206-1974.

2. Molding of Multi-layer Film

Using a three type three layer water cooling inflation molding machine manufactured by Placo (die diameter; 100 mmφ, die lip; 3 mm, die temperature; 200° C.), a tubular multi-layer film of 17.5 μm in inner and outer layer thickness, 315 μm in intermediate layer thickness and 160 mm in lay flat width was molded.

3. Evaluation of Three Layer Multi-layer Film (1) Haze

This was measured in accordance with the procedure of JIS-K7105. Smaller value means higher excellent transparency.

(2) Longitudinal Modulus of tensile Elasticity (Flexibility)

In accordance with the procedure of ISO-R1184, a sample sheet was set to an Instron type autograph to measure tensile elasticity at the longitudinal direction (drawing direction of a film or sheet). Smaller value means excellent flexibility.

(3) Pierce Strength

A conical jig (tip angle; 0.25 R, base diameter; 15.6 mm, height; 18.5 mm) was attached to an autograph DCS200 manufactured by Shimadzu, and a sample sheet was pierced with the conical jig at a rate of 50 mm/minute in an atmosphere of 23° C. Maximum strength when the sheet was broken (a hole was formed) was used as the pierce strength.

(4) Heat Resistance

A cylindrical multi-layer film (piled one over the other) was cut into a size of 140 mm×140 mm, and three sides were heat-sealed to obtain a bag. Next, the bag was filled with pure water and sealed by heat-sealing the remaining side. The thus obtained sample bag was put into a high temperature high pressure cooking sterilization testing machine (RCS-40RTGN, mfd. by Hisaka Works) and pressurized, and atmospheric temperature in the machine was increased to 121° C. and kept at 121° C. for 30 minutes. Thereafter, the sample bag was removed from the testing machine and evaluated by the following criteria. The sample having an evaluation of ○ means it has excellent heat resistance.

X: Wrinkles were formed on the sample bag, or its transparency was reduced.

○: Wrinkles were not formed on the sample bag, and its appearance before and after the temperature increase did not change.

4. Evaluation of Two Layer Multi-layer Film (1) Adhesion of outer layer to upper side seal bar: Under heat sealing conditions of heat sealing temperature of 160° C., sealing pressure of 2 kg/cm², sealing time of 3 seconds and seal bar width of 10 mm, inner sides of the multi-layer film were sealed by hot melting using a seal bar and then the seal bar was removed, and the result was marked X when the outer side of the multi-layer film adhered to the upper side seal bar, or ○ when no adhesion was found. In this connection, no adhesion of the outer side of multi-layer film to the upper side seal bar means that the optimum heat sealing temperature range is broad, so that such a multi-layer film is excellent in terms of good working efficiency and less heat seal failure and the like troubles.

(2) Heat resistance at 115° C.: A tubular (cylindrical) multi-layer film (piled one over the other) was cut into a size of 190 mm×190 mm, and three sides were heat-sealed to obtain a bag. Next, the bag was filled with 600 ml of distilled water and sealed by heat-sealing the remaining side. The thus obtained sample bag was put into a high temperature high pressure cooking sterilization testing machine (RCS-40RTGN, mfd. by Hisaka Works) and pressurized, and atmospheric temperature in the machine was increased to 115° C. and kept at 115° C. for 30 minutes. Thereafter, the sample bag was removed from the testing machine and evaluated by the following criteria. The sample having an evaluation of ○ means it has excellent heat resistance.

X: Wrinkles were formed on the sample bag, or its transparency was reduced.

○: Wrinkles were not formed on the sample bag, and its appearance before and after the temperature increase was hardly changed.

(3) Haze:

Haze (one sheet) of the sample bag sterilized at 115° C. for 30 minutes by the above method was measured in accordance with the procedure of JIS-K7105. Smaller value means higher excellent transparency.

(4) Longitudinal modulus of tensile elasticity (flexibility): In accordance with the procedure of ISO-R1184, the sample bag sterilized at 115° C. for 30 minutes by the above method was cut out, and its longitudinal modulus of tensile elasticity was measured by an Instron type autograph. Smaller value means excellent flexibility.

(5) Bag drop strength: In an atmosphere of 23° C., the distilled water-filled sample bag sterilized at 115° C. for 30 minutes by the above method was dropped three times from a height of 2 m by horizontal dropping and then three times from a height of 2 m by vertical dropping, and no breakage of the bag was marked ○, and the broken case X.

Production Example

Production of Ethylene-α-olefin Copolymer

A catalyst was prepared by the method described in JP-A-61-130314. That is, a catalyst solution was prepared by mixing 2.0 mmol of a complex, ethylenebis (4,5,6,7-tetrahydroindenyl)zirconium dichloride, with methylalmoxane manufactured by Toyo Stauffer in a 1,000 mol times larger amount than the complex, and diluting the mixture to 10 liters with toluene. Next, polymerization was carried out using the thus obtained catalyst solution in the following manner.

A 1.5 liter capacity stirring autoclave type continuous reactor was charged with a mixture of ethylene and 1-hexene having a 1-hexene compositional ratio of 83% by weight, and the reaction was carried out at a temperature of 105° C. while keeping pressure in the reactor under 1,300 kg/cm$^2$. After completion of the reaction, an ethylene-1-hexene copolymer "PE-1" having an MFR value of 2.2 g/10 minutes and an elution curve peak temperature by TREF of 55° C. was obtained.

Also, preparation of catalyst and polymerization were carried out by the same method described above, except that the composition of 1-hexene and temperature at the time of polymerization were changed, thereby obtaining an ethylene-1-hexene copolymer "PE-2" having an MFR value of 2.2 g/10 minutes and an elution curve peak temperature by TREF of 65° C.

Inventive Example 1

In this example, a polypropylene resin (PP: propylene-ethylene random copolymer) having an ethylene content of 4.0 mol % and an MFR value of 5.0 g/10 minutes was used as the outer layer-constituting resin material.

In the intermediate layer, a polyethylene resin composition was used which was obtained by mixing the "PE-1" prepared in the Production Method with a high density polyethylene (mfd. by Japan Polychem Corporation, trade name "Novatech HD-HJ560", MFR; 7 g/10 minutes, density; 0.964 g/cm$^3$) at an optional formulation ratio and then making the mixture into pellets. In this connection, this resin composition is a mixture containing a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48 and MFR of the resin composition is 2.5 g/10 minutes.

In the inner layer, the same polypropylene resin of the outer layer (propylene-ethylene random copolymer) having an ethylene content of 4.0 mol % and an MFR value of 5.0 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 1.

Inventive Example 2

A polypropylene resin (propylene-ethylene random copolymer) having an ethylene content of 4.0 mol % and an MFR value of 5.0 g/10 minutes was used as the outer layer-constituting resin material.

In the intermediate layer, a resin composition obtained by mixing the "PE-1" prepared in the Production Method with a high density polyethylene (mfd. by Japan Polychem Corporation, trade name "Novatech HD-HJ560", MFR; 7 g/10 minutes, density; 0.964 g/cm$^3$) at an optional formulation ratio and then making the mixture into pellets was used, which contains a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48 and MFR of the resin composition is 2.5 g/10 minutes.

In the inner layer, an ethylene-1-butene copolymer produced using a Ziegler type catalyst and having a density of 0.921 g/cm$^3$ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 1.

Inventive Example 3

A polypropylene resin (propylene-ethylene random copolymer) having an ethylene content of 4.0 mol % and an MFR value of 5.0 g/10 minutes was used as the outer layer-constituting resin material.

In the intermediate layer, a resin composition obtained by mixing the "PE-1" prepared in the Production Method with a high density polyethylene (mfd. by Japan Polychem Corporation, trade name "Novatech HD-HJ560", MFR; 7 g/10 minutes, density; 0.964 g/cm$^3$) at an optional formulation ratio and then making the mixture into pellets was used, which contains a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48 and MFR of the resin composition is 2.5 g/10 minutes.

In the inner layer, a high-pressure low density polyethylene having an extrapolation melting completion temperature of melting peak obtained by differential scanning calorimetry (DSC) of 112° C. and an MFR value of 0.7 g/10 minutes was used.

Each of these resin materials was set to the three type three layer water cooling inflation molding machine manufactured by Placo, and water cooling inflation molding was carried out under the conditions to obtain a multi-layer film of 350 pm in thickness and to carry out its evaluation. The results are shown in Table 1.

Inventive Example 4

A polypropylene resin (propylene-ethylene random copolymer) having an ethylene content of 4.0 mol % and an MFR value of 5.0 g/10 minutes was used as the outer layer-constituting resin material.

In the intermediate layer, a resin composition obtained by mixing the "PE-1" prepared in the Production Method with a high density polyethylene (mfd. by Japan Polychem Corporation, trade name "Novatech HD-HJ560", MFR; 7 g/10 minutes, density; 0.964 g/cm³) at an optional formulation ratio and then making the mixture into pellets was used, which contains a lower crystalline component and a higher crystalline component, in which the lower crystalline component elution peak temperature of the elution curve by TREF is 55° C., the area ratio of peak temperature or less of the lower crystalline component based on the total area of the elution curve is 45%, H/M is 30 and MFR of the resin composition is 3.1 g/10 minutes.

In the inner layer, an ethylene-1-butene copolymer produced using a Ziegler type catalyst and having a density of 0.921 g/cm³ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 1.

Inventive Example 5

A polypropylene resin (propylene-ethylene random copolymer) having an ethylene content of 4.0 mol % and an MFR value of 5.0 g/10 minutes was used as the outer layer-constituting resin material.

In the intermediate layer, a resin composition obtained by mixing the "PE-2" prepared in the Production Method with a high density polyethylene (mfd. by Japan Polychem Corporation, trade name "Novatech HD-HJ560", MFR; 7 g/10 minutes, density; 0.964 g/cm³) at an optional formulation ratio and then making the mixture into pellets was used, which contains a lower crystalline component and a higher crystalline component, in which the lower crystalline component elution peak temperature of the elution curve by TREF is 65° C., the area ratio of peak temperature or less of the lower crystalline component based on the total area of the elution curve is 57%, H/M is 46 and MFR of the resin composition is 2.5 g/10 minutes.

In the inner layer, an ethylene-1-butene copolymer produced using a Ziegler type catalyst and having a density of 0.921 g/cm³ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 1.

Comparative Example 1

A polypropylene resin (propylene-ethylene random copolymer) having an ethylene content of 4.0 mol % and an MFR value of 5.0 g/10 minutes was used as the outer layer-constituting resin material.

In the intermediate layer, a resin composition obtained by mixing the "PE-1" prepared in the Production Method with a high density polyethylene (mfd. by Japan Polychem Corporation, trade name "Novatech HD-HJ560", MFR; 7 g/10 minutes, density; 0.964 g/cm³) at an optional formulation ratio and then making the mixture into pellets was used, which contains a lower crystalline component and a higher crystalline component, in which the lower crystalline component elution peak temperature of the elution curve by TREF is 55° C., the area ratio of peak temperature or less of the lower crystalline component based on the total area of the elution curve is 30%, H/M is 15 and MFR of the resin composition is 4.4 g/10 minutes.

In the inner layer, an ethylene-1-butene copolymer produced using a Ziegler type catalyst and having a density of 0.921 g/cm³ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 2. This multi-layer film is not desirable because of its inferior transparency, flexibility and pierce strength, though its heat resistance is good.

Comparative Example 2

A polypropylene resin (propylene-ethylene random copolymer) having an ethylene content of 4.0 mol % and an MFR value of 5.0 g/10 minutes was used as the outer layer-constituting resin material. In the intermediate layer, the "PE-1" alone (lower crystalline component elution peak temperature of the elution curve by TREF is 55° C. and area ratio of peak temperature or less of the lower crystalline component based on the total area of the elution curve is 65%) was used.

In the inner layer, an ethylene-1-butene copolymer produced using a Ziegler type catalyst and having a density of 0.921 g/cm³ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 2. This multi-layer film is not desirable because of its inferior heat resistance, though its transparency, flexibility and pierce strength are good.

Comparative Example 3

A polypropylene resin (propylene-ethylene random copolymer) having an ethylene content of 4.0 mol % and an MFR value of 5.0 g/10 minutes was used as the outer layer-constituting resin material. In the intermediate layer, the "PE-2" alone (lower crystalline component elution peak temperature of the elution curve by TREF is 65° C. and the area ratio of peak temperature or less of the lower crystalline component based on the total area of the elution curve is 73%) was used.

In the inner layer, an ethylene-1-butene copolymer produced using a Ziegler type catalyst and having a density of 0.921 g/cm³ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 pm in thickness and carry out its evaluation. The results are shown in Table 2. This multi-layer film is not desirable because of its inferior heat resistance, though its transparency, flexibility and pierce strength are good.

Comparative Example 4

An ethylene-1-butene copolymer produced using a Ziegler type catalyst and having a density of 0.921 g/cm³ and an MFR value of 1.1 g/10 minutes was used in the outer layer.

In the intermediate layer, a resin composition obtained by mixing the "PE-1" prepared in the Production Method with a high density polyethylene (mfd. by Japan Polychem Corporation, trade name "Novatech HD-HJ560", MFR; 7 g/10 minutes, density; 0.964 g/cm$^3$) at an optional formulation ratio and then making the mixture into pellets was used, which contains a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48 and MFR of the resin composition is 2.5 g/10 minutes.

In the inner layer, the same ethylene-1-butene copolymer used in the outer layer, produced using a Ziegler type catalyst and having a density of 0.921 g/cm$^3$ and an MFR value of 1.1 g/10 minutes, was used.

Each of these resin materials was set to the three type three layer water cooling inflation molding machine manufactured by Placo, and water cooling inflation molding was carried out under the conditions to obtain a multi-layer film of 350 μm in thickness and carry out its evaluation. The results are shown in Table 2. This multi-layer film is not desirable because of its inferior heat resistance, though its transparency, flexibility and pierce strength are good.

Comparative Example 5

A polypropylene resin (propylene-ethylene random copolymer) having an ethylene content of 4.0 mol % and an MFR value of 5.0 g/10 minutes was used in the outer layer. In the intermediate layer, a resin composition "Ultozex 1020L" manufactured by Mitsui Chemical (the lower crystalline component elution peak temperature of the elution curve by TREF; 66° C., the area ratio of peak temperature or less of the lower crystalline component based on the total area of the elution curve; 52%, H/M; 3.5 and MFR of the resin composition; 2 g/10 minutes) was used.

In the inner layer, an ethylene-1-butene copolymer produced using a Ziegler type catalyst and having a density of 0.921 g/cm$^3$ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and to carry out its evaluation. The results are shown in Table 2. This multi-layer film has good transparency and flexibility, but its heat resistance and pierce strength are poor.

Comparative Example 6

A polypropylene resin (prbpylene-ethylene random copolymer) having an ethylene content of 4.0 mol % and an MFR value of 5.0 g/10 minutes was used in the outer layer. In the intermediate layer, a straight chain low density polyethylene (mfd. by Japan Polychem Corporation, trade name "Novatech LL-UF230", lower crystalline component elution peak temperature of the elution curve by TREF; 81° C., area ratio of peak temperature or less of the lower crystalline component based on the total area of the elution curve; 52%, H/M; 1.2 and MFR of the resin composition; 1.1 g/10 minutes) was used.

In the inner layer, an ethylene-1-butene copolymer produced using a Ziegler type catalyst and having a density of 0.921 g/cm$^3$ and an MFR value of 1.1 g/10 minutes was used.

Each of these resin materials was set to the three type three layer water cooling inflation molding machine manufactured by Placo, and water cooling inflation molding was carried out under the conditions to obtain a multi-layer film of 350 μm in thickness and carry out its evaluation. The results are shown in Table 2. Heat resistance of this multi-layer film is good, but its pierce strength, transparency and flexibility are poor.

TABLE 1

| | Inventive Example | | | | |
|---|---|---|---|---|---|
| | 1 | 2 | 3 | 4 | 5 |
| Sheet layer construction | | | | | |
| Outer layer | | | | | |
| Kind of resin (–) | PP | PP | PP | PP | PP |
| MFR (g/10 min.) | 5.0 | 5.0 | 5.0 | 5.0 | 5.0 |
| Remarks | Ethylene content 4.0 mol % | Ethylene content 4.0 mol % | Ethylene content 4.0 mol % | Ethylene content 4.0 mol % | Ethylene content 4.0 mol % |
| Intermediate layer | | | | | |
| Component A | | | | | |
| Peak temp. (° C.) | 55 | 55 | 55 | 55 | 65 |
| Area ratio (%) | 56 | 56 | 56 | 45 | 57 |
| Copolymer | | | | | |
| H/M (–) | 48 | 48 | 48 | 30 | 46 |
| MFR (g/10 min.) | 2.5 | 2.5 | 2.5 | 3.1 | 2.5 |
| Inner layer | | | | | |
| Kind of resin (–) | PP | L-LD | HPLD | L-LD | L-LD |
| MFR (g/10 min.) | 5.0 | 1.1 | 0.7 | 1.1 | 1.1 |
| Remarks | Ethylene | Density | Temp.* | Density | Density |

TABLE 1-continued

|  | Inventive Example | | | | |
|---|---|---|---|---|---|
|  | 1 | 2 | 3 | 4 | 5 |
|  | content 4.0 mol % | 0.921 | 112° C. | 0.921 | 0.921 |
| Physical properties of sheet | | | | | |
| Haze (%) | 3.1 | 2.9 | 3.6 | 5.8 | 3.7 |
| Longitudinal modulus of tensile elasticity (kg/cm²) | 980 | 850 | 820 | 1400 | 1200 |
| Pierce strength (g) | 25 | 23 | 22 | 19 | 20 |
| Heat resistance (−) | ○ | ○ | ○ | ○ | ○ |

*Extrapolation melting completion temperature

TABLE 2

|  | Comparative Examples | | | | | |
|---|---|---|---|---|---|---|
|  | 1 | 2 | 3 | 4 | 5 | 6 |
| Sheet layer construction | | | | | | |
| Outer layer | | | | | | |
| Kind of resin (−) | PP | PP | PP | L-LD | PP | PP |
| MFR (g/10 min.) | 5.0 | 5.0 | 5.0 | 1.1 | 5.0 | 5.0 |
| Remarks | Ethylene content 4.0 mol % | Ethylene content 4.0 mol % | Ethylene content 4.0 mol % | Density 0.921 | Ethylene content 4.0 mol % | Ethylene content 4.0 mol % |
| Intermediate layer | | | | | | |
| Component A | | | | | | |
| Peak temp. (° C.) | 55 | 55 | 65 | 55 | 66 | 81 |
| Area ratio (%) | 30 | 65 | 73 | 56 | 52 | 52 |
| Copolymer | | | | | | |
| H/M (−) | 15 | — | — | 48 | 3.5 | 1.2 |
| MFR (g/10 min.) | 4.4 | 2.2 | 2.2 | 2.5 | 2.0 | 1.1 |
| Inner layer | | | | | | |
| Kind of resin (−) | L-LD | L-LD | L-LD | L-LD | L-LD | L-LD |
| MFR (g/10 min.) | 1.1 | 1.1 | 1.1 | 1.1 | 1.1 | 1.1 |
| Remarks | Density 0.921 | Density 0.921 | Density 0.921 | Density 0.921 | Density 0.921 | Density 0.921 |
| Physical properties of sheet | | | | | | |
| Haze (%) | 12.3 | 2.8 | 3.2 | 3.1 | 3.8 | 7.2 |
| Longitudinal modulus of tensile elasticity (kg/cm²) | 2240 | 810 | 920 | 800 | 1370 | 1850 |
| Pierce strength (g) | 8 | 25 | 22 | 21 | 14 | 9 |
| Heat resistance (−) | ○ | X | X | X | X | ○ |

Inventive Example 6

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting polyolefin resin material.

Also, a polyethylene resin composition obtained by mixing the "PE-1" with a high density polyethylene (mfd. by Japan Polychem Corporation, trade name "Novatech HD-HJ562", MFR; 7 g/10 minutes, density; 0.964 g/cm³) at a ratio of 90:10 and then making the mixture into pellets was used as the inner layer. In this connection, this resin composition is a mixture containing a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48, MFR of the resin composition is 2.5 g/10 minutes and the Vicat softening temperature is 81° C.

Using a two type two layer water cooling inflation molding machine manufactured by Placo (die diameter; 100 mmφ, die lip; 3 mm, die temperature; 200° C.), a tubular multi-layer film of 250 μm multi-layer film (37.5 μm in outer layer thickness and 212.5 μm in intermediate layer thickness) having a lay flat width of 200 mm was molded from these inner and outer layer resin materials. Its evaluation results are shown in Table 3.

Inventive Example 7

A high-pressure low density polypropylene (HP-LD) having an extrapolation melting completion temperature of melting peak, obtained by a differential scanning calorimetry (DSC), of 113° C., an MFR value of 2.8 g/10 minutes and a Vicat softening temperature of 98° C. was used as the outer layer-constituting polyolefin resin material.

Also, a polyethylene resin composition obtained by mixing the "PE-l" with a high density polyethylene (mfd. by Japan Polychem Corporation, trade name "Novatech HD-HJ562", MFR; 7 g/10 minutes, density; 0.964 g/cm$^3$) at a formulation ratio of 90:10 and then making the mixture into pellets was used as the inner layer. In this connection, this resin composition is a mixture containing a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48, MFR of the resin composition is 2.5 g/10 minutes and the Vicat softening temperature is 81° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 3.

Inventive Example 8

An ethylene-1-butene copolymer (L-LD) produced using a Ziegler type catalyst, having a density of 0.92.1 g/cm$^3$ an MFR value of 1.1 g/10 minutes and a Vicat softening temperature of 102° C. was used as the outer layer-constituting polyolefin resin material.

Also, a polyethylene resin composition obtained by mixing the "PE-1" with a high density polyethylene (mfd. by Japan Polychem Corporation, trade name "Novatech HD-HJ562", MFR; 7 g/10 minutes, density; 0.964 g/cm$^3$) at a formulation ratio of 90:10 and then making the mixture into pellets was used as the inner layer. In this connection, this resin composition is a mixture containing a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48, MFR of the resin composition is 2.5 g/10 minutes and the Vicat softening temperature is 81° C.

Each of these inner and outer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 3.

Inventive Example 9

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting resin material.

Also, a polyethylene resin composition obtained by mixing the "PE-1" with a high density polyethylene (mfd. by Japan Polychem Corporation, trade name "Novatech HD-HJ562", MFR; 7 g/10 minutes, density; 0.964 g/cm$^3$) at a formulation ratio of 70:30 and then making the mixture into pellets was used as the inner layer. In this connection, this resin composition is a mixture containing a lower crystalline component and a higher crystalline component, in which the lower crystalline component elution peak temperature of the elution curve by TREF is 55° C., the area ratio of peak temperature or less of the lower crystalline component based on the total area of the elution curve is 45%, H/M is 30, MFR of the resin composition is 3.1 g/10 minutes and the Vicat softening temperature is 101° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 3.

Inventive Example 10

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting resin material.

Also, a polyethylene resin composition obtained by mixing the "PE-2" with a high densitypolyethylene (mfd. by Japan Polychem Corporation, trade name "Novatech HD-HJ562", MFR; 7 g/10 minutes, density; 0.964 g/cm$^3$) at a formulation ratio of 90:10 and then making the mixture into pellets was used as the inner layer. In this connection, this resin composition is a mixture containing a lower crystalline component and a higher crystalline component, in which the lower crystalline component elution peak temperature of the elution curve by TREF is 70° C., the area ratio of peak temperature or less of the lower crystalline component based on the total area of the elution curve is 57%, H/M is 46, MFR of the resin composition is 2.5 g/10 minutes and the Vicat softening temperature is 98° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 3.

Inventive Example 11

A polyethylene resin composition (ethylene-1-hexene copolymer; L-LD) obtained by mixing the "PE-2" with a high density polyethylene (mfd. by Japan Polychem Corporation, trade name "Novatech HD-HJ562", MFR; 7 g/10 minutes, density; 0.964 g/cm$^3$) at a formulation ratio of 90:10 and then making the mixture into pellets was used as the outer layer-constituting polyolefin resin material. In this connection, this resin composition is amixture containing a lower crystalline component and a higher crystalline component and having a density of 0.913 g/cm$^3$, an MFR value of 2.5 g/10 minutes and a Vicat softening temperature of 98° C.

Also, a polyethylene resin composition obtained by mixing the "PE-1" with a high density polyethylene (mfd. by Japan Polychem Corporation, trade name "Novatech HD-HJ562", MFR; 7 g/10 minutes, density; 0.964 g/cm$^3$) at a formulation ratio of 90:10 and then making the mixture into pellets was used as the inner layer. In this connection, this resin composition is a mixture containing a lower crystalline component and a higher crystalline component, in which the lower crystalline component elution peak temperature of the elution curve by TREF is 55° C., the area ratio of peak temperature or less of the lower crystalline component based on the total area of the elution curve is 56%, H/M is 48, MFR of the resin composition is 2.5 g/10 minutes and the Vicat softening temperature is 81° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 3.

Comparative Example 7

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting polyolefin resin material.

Also, the "PE-2" alone was used as the inner layer. In this connection, this resin material has an elution peak temperature of the elution curve by TREF of 70° C., an MFR value of 2.2 g/10 minutes and a Vicat softening temperature of 93° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 4.

This multi-layer film is not desirable because of its inferior heat resistance, though its outer layer does not adhere to the upper side seal bar and its transparency, flexibility and bag drop strength are good.

Comparative Example 8

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting polyolefin resin material.

Also, "Ultozex 1020L" manufactured by Mitsui Chemical (ethylene-4-methylpentene-1 copolymer having a lower crystalline component elution peak temperature of the elution curve by TREF of 66° C., an area ratio of peak temperature or less of the lower crystalline component based on the total area of the elution curve of 52%, an H/M value of 3.5, an MFR value of the resin composition of 2 g/10 minutes and a Vicat softening temperature of 93° C.) was used as the inner layer.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 4.

This multi-layer film is not desirable because of its inferior transparency and heat resistance, though its outer layer does not adhere to the upper side seal bar and its flexibility and bag drop strength are good.

Comparative Example 9

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting polyolefin resin material.

Also, "Novatech LL-UF230" manufactured by Japan Polychem Corporation (ethylene-1-butene having a lower crystalline component elution peak temperature of the elution curve by TREF of 81° C., an area ratio of peak temperature or less of the lower crystalline component based on the total area of the elution curve of 52%, an H/M value of 1.2, an MFR value of the resin composition 1.1 g/10 minutes and a Vicat softening temperature of 102° C.) was used as the inner layer.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 4.

This multi-layer film is not desirable because of its inferior transparency and flexibility, though its outer layer does not adhere to the upper side seal bar and its heat resistance and bag drop strength are good.

Comparative Example 10

An ethylene-4-methylpentene-1 copolymer (L-LD) produced using a Ziegler type catalyst, having a density of 0.910 g/cm$^3$, an MFR value of 2.0 g/10 minutes and a Vicat softening temperature of 93° C., was used as the outer layer-constituting polyolefin resin material.

Also, a polyethylene resin composition obtained by mixing the "PE-2" with a high densitypolyethylene (mfd. by Japan Polychem Corporation, trade name "Novatech HD-HJ562", MFR; 7 g/10 minutes, density; 0.964 g/cm$^3$) at a formulation ratio of 90:10 and then making the mixture into pellets was used as the inner layer. In this connection, this resin composition is a mixture containing a lower crystalline component and a higher crystalline component, in which the lower crystalline component elution peak temperature of the elution curve by TREF is 70° C., the area ratio of peak temperature or less of the lower crystalline component based on the total area of the elution curve is 57%, H/M is 46, MFR of the resin composition is 2.5 g/10 minutes and the Vicat softening temperature is 98° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 4.

This multi-layer film is not desirable, because its outer layer adheres to the upper side seal bar, which reduces working efficiency and causes troubles, though its heat resistance, transparency, flexibility and bag drop strength are good.

Comparative Example 11

A polypropylene resin (PP: propylene-ethylene random copolymer) having an ethylene content of 5.9 mol %, an MFR value of 6.0 g/10 minutes and a Vicat softening temperature of 130° C. was used as the outer layer-constituting polyolefin resin material.

Also, a polyethylene resin composition obtained by mixing the "PE-2" with a high density polyethylene (mfd. by Japan Polychem Corporation, trade name "Novatech HD-HJ562", MFR; 7 g/10 minutes, density; 0.964 g/cm$^3$) at a formulation ratio of 40:60 and then making the mixture into pellets was used as the inner layer. In this connection, this resin composition is a mixture containing a lower crystalline component and a higher crystalline component, in which the lower crystalline component elution peak temperature of the elution curve by TREF is 70° C., the area ratio of peak temperature or less of the lower crystalline component based on the total area of the elution curve is 30%, H/M is 15, MFR of the resin composition is 4.4 g/10 minutes and the Vicat softening temperature is 120° C.

Each of these inner and outer layer resin materials was set to the two type two layer water cooling inflation molding machine manufactured by Placo, and water cooling inflation molding was carried out under the conditions to obtain a multi-layer film of 250 μm in thickness and to carry out its evaluation. The results are shown in Table 4.

This multi-layer film is not desirable because of its inferior transparency, flexibility and bag drop strength, though its outer layer does not adhere to the upper side seal bar and its heat resistance is good.

TABLE 3

|  |  | Inventive Example | | | | | |
|---|---|---|---|---|---|---|---|
|  |  | 6 | 7 | 8 | 9 | 10 | 11 |
| Sheet layer construction | | | | | | | |
| Outer layer | | | | | | | |
| Kind of resin | | PP | HP-LD | L-LD | PP | PP | L-LD |
| MFR | g/10 min. | 6.0 | 2.8 | 1.1 | 6.0 | 6.0 | 2.5 |
| Vicat softening temperature (Ta) | (° C.) | 130 | 98 | 102 | 130 | 130 | 98 |
| Ethylene content (mol %), | | Ethylene | Melting | Density | Ethylene | Ethylene | Density |
| Melting temperature (° C.), | | content | temp. | 0.921 | content | content | 0.913 |
| Density (g/cm³) | | 5.9 mol % | 113° C. |  | 5.9 mol % | 5.9 mol % |  |
| Inner layer | | | | | | | |
| Component A | | | | | | | |
| Low crystalline component | | | | | | | |
| TREF elution curve peak temp. | ° C. | 55 | 55 | 55 | 55 | 70 | 55 |
| Ratio of peak temperature or less based on the total area of TREF elution curve | % | 56 | 56 | 56 | 45 | 57 | 56 |
| Copolymer | | | | | | | |
| H/M | — | 48 | 48 | 48 | 30 | 46 | 48 |
| MFR | g/10 min. | 2.5 | 2.5 | 2.5 | 3.1 | 2.5 | 2.5 |
| Vicat softening temp. (Tb) | ° C. | 81 | 81 | 81 | 101 | 98 | 81 |
| Physical properties of sheet | | | | | | | |
| Adhesion of outer layer to upper side seal bar | — | ○ | ○ | ○ | ○ | ○ | ○ |
| Heat resistance | — | ○ | ○ | ○ | ○ | ○ | ○ |
| Haze | % | 15 | 12 | 14 | 22 | 17 | 10 |
| Longitudinal modulus of tensile elasticity | kg/cm² | 1920 | 1500 | 1520 | 2410 | 2110 | 1420 |
| Bag drop strength | — | ○ | ○ | ○ | ○ | ○ | ○ |

TABLE 4

|  |  | Comparative Example | | | | |
|---|---|---|---|---|---|---|
|  |  | 7 | 8 | 9 | 10 | 11 |
| Sheet layer construction | | | | | | |
| Outer layer | | | | | | |
| Kind of resin | | PP | PP | PP | L-LD | PP |
| MFR | g/10 min. | 6.0 | 6.0 | 6.0 | 2.0 | 6.0 |
| Vicat softening temperature (Ta) | (° C.) | 130 | 130 | 130 | 93 | 130 |
| Ethylene content (mol %), | | Ethylene | Ethylene | Ethylene | Density | Ethylene |
| Melting temperature (° C.), | | content | content | content | 0.910 | content |
| Density (g/cm³) | | 5.9 mol % | 5.9 mol % | 5.9 mol % |  | 5.9 mol % |
| Inner layer | | | | | | |
| Component A | | | | | | |
| Low crystalline component | | | | | | |
| TREF elution curve peak temp. | ° C. | 70 | 66 | 81 | 70 | 70 |
| Ratio of peak temperature or less based on the total area of TREF elution curve | % | — | 52 | 52 | 57 | 30 |

TABLE 4-continued

|  |  | Comparative Example | | | | |
|---|---|---|---|---|---|---|
|  |  | 7 | 8 | 9 | 10 | 11 |
| Copolymer | | | | | | |
| H/M |  | — | — | 3.5 | 1.2 | 46 | 15 |
| MFR | g/10 min. | 2.2 | 2.0 | 1.1 | 2.5 | 4.4 |
| Vicat softening temp. (Tb) | °C. | 93 | 93 | 102 | 98 | 120 |
| Physical properties of sheet | | | | | | |
| Adhesion of outer layer to upper side seal bar | — | ○ | ○ | ○ | X | ○ |
| Heat resistance | — | X | X | ○ | ○ | ○ |
| Haze | % | 16 | 38 | 31 | 15 | 43 |
| Longitudinal modulus of tensile elasticity | kg/cm² | 1900 | 1960 | 2800 | 1580 | 3900 |
| Bag drop strength | — | ○ | ○ | ○ | ○ | X |

Thus, as has been described in the foregoing, not only the multi-layer film of the invention has good hygienic nature but it also has markedly excellent flexibility and transparency, excellent heat resistance, pin hole resistance (pierce strength) and bag drop strength, which cause problems at the time of transportation and handling, and heat seal aptitude. Accordingly, it can be suitably used as medical bags, particularly as infusion bags and the like soft containers in the medical field.

Also, not only the medical bag of the invention has good hygienic nature but it also has markedly excellent flexibility and transparency and excellent heat resistance and pin hole resistance (pierce strength) which causes problems at the time of transportation, so that it can be suitably used as infusion bags and the like containers in the medical field.

What is claimed is:

1. A multi-layer film, comprising at least a first layer, a second layer inside thereof, and a third layer inside the second layer;

wherein the first layer comprises a polypropylene resin; and wherein the second layer comprises a polyethylene resin material, comprising (i) from 70 to 90 wt % of a lower crystalline component and (ii) from 10 to 30 wt % of a higher crystalline component and satisfying the following physical properties (B1) to (B4):

(B1) in a temperature rising elution fraction elution curve of the polyethylene resin material, an elution peak temperature of the lower crystalline component is from 45 to 85° C.;

(B2) in the temperature rising elution fraction elution curve of the polyethylene resin material, an H/M value is 9 or more, wherein H is a peak height of the lower crystalline component and M is a height of the minimum valley between the lower crystalline component peak and the higher crystalline component peak;

(B3) an area ratio of the elution peak temperature of less of the lower crystalline component is 35% or more based on the total area of the temperature rising elution fraction elution curve of the polyethylene resin material; and (B4) a melt flow rate of the polyethylene resin material is from 0.1 to 20 g/10 minutes; and wherein the third layer comprises a resin material selected from the group consisting of a) a polypropylene resin; b) a high-pressure low density polyethylene having an extrapolation melting completion temperature of melting peak, obtained by a differential scanning calorimetry (DSC), of 110° C. or more; and c) a copolymer of ethylene with an α-olefin having from 3 to 18 carbon atoms, having a density of 0.920 g/cm³ or more.

2. The multi-layer film according to claim 1, wherein the lower crystalline component of the copolymer of ethylene with an a-olefin having from 3 to 18 carbon atoms in the second layer is polymerized using a metallocene compound containing a tetravalent transition metal, as a polymerization catalyst.

3. The multi-layer film according to claim 1, wherein the copolymer in the second layer further satisfies a physical property (B5), and the polypropylene resin in the first layer satisfies a physical property (A1):

(B5) Vicat softening temperature Tb is from 65 to 125° C., and (A1) Vicat softening temperature Ta is Tb<Ta≦140° C.

4. A medical bag comprising the multi-layer film according to claim 1.

5. The multi-layer film according to claim 1, wherein the lower crystalline component has a density of from 0.870 to 0.925 g/cm³.

6. The multi-layer film according to claim 1, wherein the higher crystalline component has a density of from 0.935 to 0.968 g/cm³.

7. The multi-layer film according to claim 1, wherein the lower crystalline component has a density of from 0.870 to 0.925 g/cm³ and the higher crystalline component has a density of from 0.935 to 0.968 g/cm³.

8. The multi-layer film according to claim 1, wherein the polyethylene resin material further comprises a copolymer mixture of ethylene with an α-olefin having from 3 to 18 carbon atoms.

* * * * *